United States Patent
Katsumata et al.

(10) Patent No.: US 12,256,086 B2
(45) Date of Patent: Mar. 18, 2025

(54) INFORMATION PROCESSING APPARATUS AND METHOD

(71) Applicant: Sony Group Corporation, Tokyo (JP)

(72) Inventors: Mitsuru Katsumata, Tokyo (JP); Mitsuhiro Hirabayashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 43 days.

(21) Appl. No.: 18/040,816

(22) PCT Filed: Sep. 2, 2021

(86) PCT No.: PCT/JP2021/032228
§ 371 (c)(1),
(2) Date: Feb. 7, 2023

(87) PCT Pub. No.: WO2022/059495
PCT Pub. Date: Mar. 24, 2022

(65) Prior Publication Data
US 2023/0308661 A1 Sep. 28, 2023

Related U.S. Application Data

(60) Provisional application No. 63/118,797, filed on Nov. 27, 2020, provisional application No. 63/078,573, filed on Sep. 15, 2020.

(51) Int. Cl.
*H04N 19/00* (2014.01)
*H04N 19/172* (2014.01)

(52) U.S. Cl.
CPC .................. *H04N 19/172* (2014.11)

(58) Field of Classification Search
CPC .................................................. H04N 19/172
See application file for complete search history.

(56) References Cited

U.S. PATENT DOCUMENTS

2019/0014350 A1   1/2019  Wang
2021/0195163 A1*  6/2021  Oh ..................... H04N 13/161

FOREIGN PATENT DOCUMENTS

WO      2019/168304 A1    9/2019
WO   WO-2020053477 A2 *   3/2020 ............. H04L 65/70

OTHER PUBLICATIONS

International Search Report and Written Opinion mailed on Nov. 16, 2021, received for PCT Application PCT/JP2021/032228, filed on Sep. 2, 2021, 9 pages including English Translation.

(Continued)

*Primary Examiner* — Zhihan Zhou
(74) *Attorney, Agent, or Firm* — XSENSUS LLP

(57) ABSTRACT

The present disclosure relates to an information processing apparatus and a method capable of suppressing an increase in load of reproduction processing.
A file storing a bitstream track storing a bitstream of content having a subpicture in a frame and an extract base track storing subpicture specifying information which is information for specifying a subpicture to be extracted in the bitstream track is generated. Further, a subpicture is extracted from the bitstream track and a bitstream is generated on the basis of the extract base track of the file. The present disclosure can be applied to, for example, an information processing apparatus, an information processing method, or the like.

20 Claims, 25 Drawing Sheets

(56) References Cited

OTHER PUBLICATIONS

"Information technology—Coded representation of immersive media—Part 10: Carriage of Visual Volumetric Video-based Coding Data", ISO/IEC JTC 1/SC 29, ISO/IEC 23090-10:2020 (E), Aug. 23, 2020, pp. 1-54.

"Information technology—Coding of audio-visual objects—Part 12:ISO base media file format", ISO/IEC JTC 1/SC 29/ISO/IEC 14496-12, Feb. 20, 2015, pp. 1-258.

"Information technology—Coding of audio-visual objects—Part 15: Carriage of network abstraction layer (NAL) unit structured video in the ISO base media file format", ISO/IEC FDIS 14496-15:2014(E), ISO/IEC JTC 1/SC 29/WG 11, Jan. 13, 2014, pp. 1-174.

"Information technology—Coding of audio-visual objects—Part 15: Carriage of network abstraction layer (NAL) unit structured video in the ISO base media file format", ISO/IEC 14496-15:2019 (E), ISO/IEC JTC 1/SC 29/WG 11, Sep. 2019, pp. 1-171.

Bross et al., "Versatile Video Coding (Draft 10)", Joint Video Experts Team (JVET) of ITU-T SG 16 WP 3 and ISO/IEC JTC 1/SC 29/WG 11, JVET-S2001-vH, Jun. 22-Jul. 1, 2020, pp. 1-502.

Hannuksela (Nokia) M M: "[OMAF] Sub-picture-related definitions", 128. MPEG Meeting Oct. 7, 2019-Oct. 10, 2019, (Motion Picture Expert Group or 1S0/IEC JTC1/SC29/WG11), Sep. 27, 2019 (Sep. 27, 2019), No. m50622, XP030221071.

Mitsuru Katsumata et al: "(8.1) Improvements on subpicture extraction in VVC File Format", 133. MPEG Meeting;Jan. 11, 2021-Jan. 15, 2021; Online; (Motion Picture Expert Group or 1S0/IEC JTC1/SC29/WG11), Jan. 14, 2021 (Jan. 14, 2021), No. m55922, XP030290757.

Mitsuru Katsumata et al: "Improvements on subpicture extraction in VVC File Format", 132. MPEG Meeting;Oct. 12, 2020-Oct. 16, 2020; Online; (Motion Picture Expert Group or 1S0/IEC JTC1/SC29/WG11), Oct. 15, 2020 (Oct. 15, 2020), No. m55040, XP030291787.

\* cited by examiner

FIG. 2

| | Descriptor |
|---|---|
| seq_parameter_set_rbsp( ) { | |
| ... | |
| sps_pic_width_max_in_luma_samples | ue(v) |
| sps_pic_height_max_in_luma_samples | ue(v) |
| ... | |
| sps_subpic_info_present_flag | u(1) |
| if( sps_subpic_info_present_flag ) { | |
| sps_num_subpics_minus1 | ue(v) |
| if( sps_num_subpics_minus1 > 0 ) { | |
| sps_independent_subpics_flag | u(1) |
| sps_subpic_same_size_flag | u(1) |
| } | |
| for( i = 0; sps_num_subpics_minus1 > 0 && i <= sps_num_subpics_minus1; i++ ) { | |
| if( !sps_subpic_same_size_flag || i == 0 ) { | |
| if( i > 0 && sps_pic_width_max_in_luma_samples > CtbSizeY ) | |
| sps_subpic_ctu_top_left_x[ i ] | u(v) |
| if( i > 0 && sps_pic_height_max_in_luma_samples > CtbSizeY ) | |
| sps_subpic_ctu_top_left_y[ i ] | u(v) |
| if( i < sps_num_subpics_minus1 && | |
| sps_pic_width_max_in_luma_samples > CtbSizeY ) | |
| sps_subpic_width_minus1[ i ] | u(v) |
| if( i < sps_num_subpics_minus1 && | |
| sps_pic_height_max_in_luma_samples > CtbSizeY ) | |
| sps_subpic_height_minus1[ i ] | u(v) |
| } | |
| if( !sps_independent_subpics_flag) { | |
| sps_subpic_treated_as_pic_flag[ i ] | u(1) |
| sps_loop_filter_across_subpic_enabled_flag[ i ] | u(1) |
| } | |
| } | |
| sps_subpic_id_len_minus1 | ue(v) |
| sps_subpic_id_mapping_explicitly_signalled_flag | u(1) |
| if( sps_subpic_id_mapping_explicitly_signalled_flag ) { | |
| sps_subpic_id_mapping_present_flag | u(1) |
| if( sps_subpic_id_mapping_present_flag ) | |
| for( i = 0; i <= sps_num_subpics_minus1; i++ ) | |
| sps_subpic_id[ i ] | u(v) |
| } | |
| } | |
| ... | |

RESOLUTION INFORMATION OF PICTURE

LAYOUT SKIP FLAG OF SUBPICTURE

LAYOUT INFORMATION OF SUBPICTURE

IDENTIFICATION INFORMATION OF SUBPICTURE

FIG. 3

| | Descriptor |
|---|---|
| pic_parameter_set_rbsp( ) { | |
| ... | |
| pps_pic_width_in_luma_samples | ue(v) |
| pps_pic_height_in_luma_samples | ue(v) |
| ... | |
| pps_no_pic_partition_flag | u(1) |
| pps_subpic_id_mapping_present_flag | u(1) |
| if( pps_subpic_id_mapping_present_flag ) { | |
| pps_num_subpics_minus1 | ue(v) |
| pps_subpic_id_len_minus1 | ue(v) |
| for( i = 0; i <= pps_num_subpics_minus1; i++ ) | |
| pps_subpic_id[ i ] | u(v) |
| } | |
| if( !pps_no_pic_partition_flag ) { | |
| pps_log2_ctu_size_minus5 | u(2) |
| pps_num_exp_tile_columns_minus1 | ue(v) |
| pps_num_exp_tile_rows_minus1 | ue(v) |
| for( i = 0; i <= pps_num_exp_tile_columns_minus1; i++ ) | |
| pps_tile_column_width_minus1[ i ] | ue(v) |
| for( i = 0; i <= pps_num_exp_tile_rows_minus1; i++ ) | |
| pps_tile_row_height_minus1[ i ] | ue(v) |
| if( NumTilesInPic > 1 ) { | |
| pps_loop_filter_across_tiles_enabled_flag | u(1) |
| pps_rect_slice_flag | u(1) |
| ... | |

RESOLUTION INFORMATION OF PICTURE: pps_pic_width_in_luma_samples, pps_pic_height_in_luma_samples IDENTIFICATION INFORMATION OF SUBPICTURE: pps_no_pic_partition_flag through pps_subpic_id[ i ]

tile INFORMATION: pps_log2_ctu_size_minus5 through pps_rect_slice_flag

FIG. 4

| | |
|---|---|
| if( pps_rect_slice_flag ) | |
|   pps_single_slice_per_subpic_flag | u(1) |
|   if( pps_rect_slice_flag &&  !pps_single_slice_per_subpic_flag ) { | |
|     pps_num_slices_in_pic_minus1 | ue(v) |
|     if( pps_num_slices_in_pic_minus1 > 1 ) | |
|       pps_tile_idx_delta_present_flag | u(1) |
|     for( i = 0; i < pps_num_slices_in_pic_minus1; i++ ) { | |
|       if( SliceTopLeftTileIdx[ i ] % NumTileColumns != NumTileColumns − 1 ) | |
|         pps_slice_width_in_tiles_minus1[ i ] | ue(v) |
|       if( SliceTopLeftTileIdx[ i ] / NumTileColumns != NumTileRows − 1 &&<br>        ( pps_tile_idx_delta_present_flag \|\|<br>        SliceTopLeftTileIdx[ i ] % NumTileColumns == 0 ) ) | |
|         pps_slice_height_in_tiles_minus1[ i ] | ue(v) |
|       if( pps_slice_width_in_tiles_minus1[ i ] == 0 &&<br>        pps_slice_height_in_tiles_minus1[ i ] == 0 &&<br>        RowHeightVal[ SliceTopLeftTileIdx[ i ] / NumTileColumns ] > 1 ) { | |
|         pps_num_exp_slices_in_tile[ i ] | ue(v) |
|         for( j = 0; j < pps_num_exp_slices_in_tile[ i ]; j++ ) | |
|           pps_exp_slice_height_in_ctus_minus1[ i ][ j ] | ue(v) |
|         i += NumSlicesInTile[ i ] − 1 | |
|       } | |
|       if( pps_tile_idx_delta_present_flag && i < pps_num_slices_in_pic_minus1 ) | |
|         pps_tile_idx_delta_val[ i ] | se(v) |
|     } | |
|   } | |
|   if( !pps_rect_slice_flag \|\| pps_single_slice_per_subpic_flag \|\|<br>    pps_num_slices_in_pic_minus1 > 0 ) | |
|     pps_loop_filter_across_slices_enabled_flag | u(1) |
| } | | slice INFORMATION

FIG. 6

```
aligned(8) class VvcSubpicOrderEntry() extends
VisualSampleGroupEntry('spor')
{
    unsigned int(1) subpic_id_info_flag;
    unsigned int(15) num_subpic_ref_idx;
    for (i = 0; i < num_subpic_ref_idx; i++)
        unsigned int(16) subp_track_ref_idx;
    if (subpic_id_info_flag) {
        unsigned int(4) subpic_id_len_minus1;
        unsigned int(12) subpic_id_bit_pos;
        unsigned int(1) start_code_emul_flag;
        unsigned int(1) pps_subpic_id_flag;
        if (pps_subpic_id_flag)
            unsigned int(6) pps_id;
        else {
            unsigned int(1) sps_subpic_id_flag;
            unsigned int(4) sps_id;
            bit(1) reserved = 0;
        }
    }
}
```

NUMBER OF SUBPICTURES
DECODING ORDER OF SUBPICTURE
REWRITING INFORMATION OF SUBPICTURE ID

FIG. 7

```
aligned(8) class VvcSubpicIDEntry() extends VisualSampleGroupEntry('spid')
{
    unsigned int(8) num_subpics_minus1;
    for ( i = 0; i <= num_subpics_minus1; i++)
        unsigned int(16) subpic_id;
}
``` num_subpics_minus1 plus 1 specifies the number of VVC subpictures contained in the sample mapped to this sample group description entry.
subpic_id for loop counter i specifies the i-th subpicture identifier, in decoding order, contained in the sample mapped to this sample group description entry.

FIG. 9

```
class TileRegionGroupEntry() extends VisualSampleGroupEntry ('trif'){
    unsigned int(16) groupID;
    unsigned int(1) tile_region_flag;
    if (!tile_region_flag)
        bit(7) reserved = 0;
    else {
        unsigned int(2) independent_idc;
        unsigned int(1) full_picture;
        unsigned int(1) filtering_disabled;
        unsigned int(1) has_dependency_list;
        bit(2) reserved = 0;
        if (!full_picture) {
            unsigned int(16) horizontal_offset;
            unsigned int(16) vertical_offset;
        }
        unsigned int(16) region_width;
        unsigned int(16) region_height;
        if (has_dependency_list) {
            unsigned int(16) dependency_tile_count;
            for (i=1; i<= dependency_tile_count; i++)
                unsigned int(16) dependencyTileGroupID;
        }
    }
}
```

IDENTIFIER OF tile region group entry

POSITION AND SIZE INFORMATION OF tile region

DEPENDENCIES BETWEEN tile regions

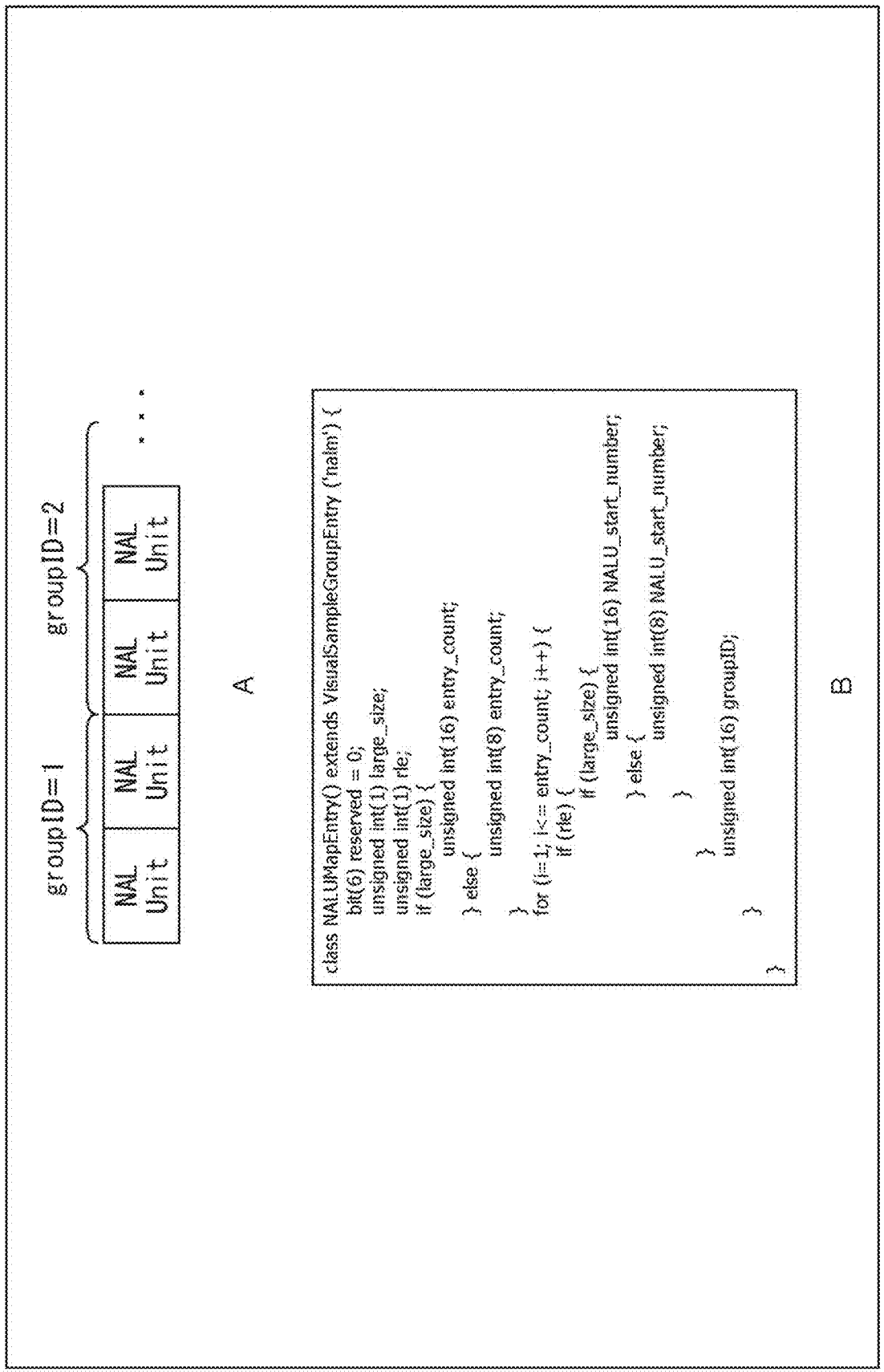

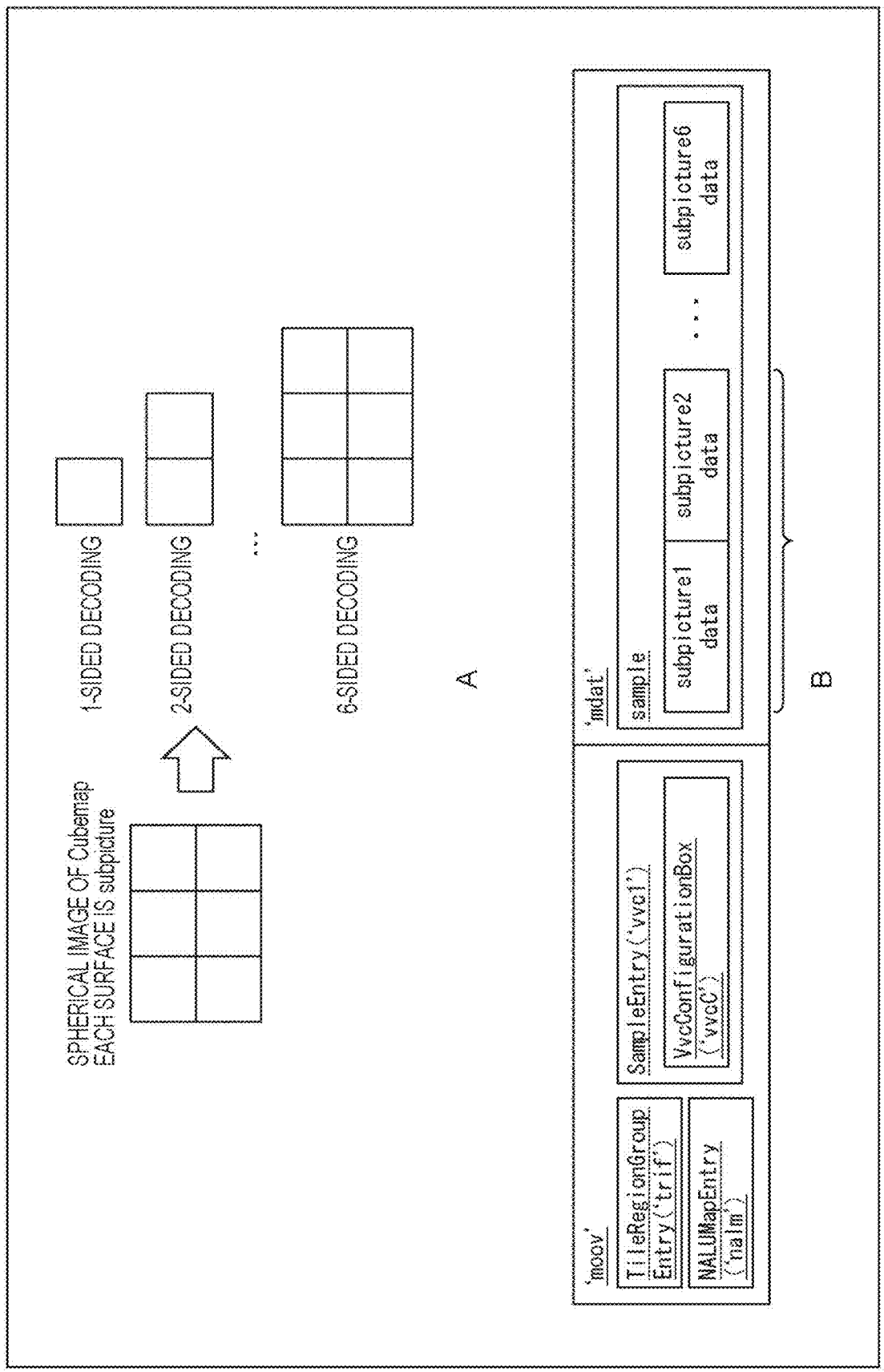

FIG. 13

| METHOD 1 | STORE VVC extract base track WITH RECONSTRUCTION INFORMATION SUCH AS PARAMETER SET REQUIRED WHEN RECONSTRUCTING bitstream FROM SOME subpictures |
|---|---|
| METHOD 1-1 | STORE track TO BE USED FOR REPRODUCING AND extract INFORMATION FOR SPECIFYING subpicture TO BE REPRODUCED IN THAT track IN VVC base track |
| METHOD 1-1-1 | DEFINE sample group AND STORE extract INFORMATION THAT ALLOWS CLIENT TO SELECT ONE FROM set OF MULTIPLE subpictures |
| METHOD 1-2 | EXPAND Subpicture ID sample group AND STORE subpicture&tile MAPPING INFORMATION INDICATING file region INCLUDING subpicture |
| METHOD 1-2-1 | OMISSION flag FOR subpicture&tile MAPPING INFORMATION |
| METHOD 2 | EXTRACT subpicture FROM MULTIPLE tracks USING VVC base truck AND VVC extract base track |
| METHOD 3 | track STRUCTURE OF V3C File Format USING METHOD 1 |

FIG. 15

```
aligned(8) class VvcSubpicExtractionEntry() extends VisualSampleGroupEntry('spex') {
    unsigned int(1) subpic_id_info_flag;
    unsigned int(7) reserved;
    unsigned int(16) num_region_set;
    for (j=0; i<num_region_set; i++){
        unsigned int (16) num_regions_in_set;
        unsigned int (16) region_set_id;
        for (j=0; j<num_regions_in_set; j++)
            unsigned int(16) groupID;
    }
    unsigned int(16) num_regions;
    for (j=0; i<num_regions; i++)
        unsigned int (16) region_idx;

if (subpic_id_info_flag) {
        unsigned int(4) subpic_id_len_minus1;
        unsigned int(12) subpic_id_bit_pos;
        unsigned int(1) start_code_emul_flag;
        unsigned int(1) pps_subpic_id_flag;
        if (pps_subpic_id_flag)
            unsigned int(6) pps_id;
        else {
            unsigned int(1) sps_subpic_id_flag;
            unsigned int(4) sps_id;
            bit(1) reserved = 0;
        }
    }
}
```

FIG. 16

```
aligned(8) class VvcSubpicIDEntry() extends VisualSampleGroupEntry('spid')
{
    unsigned int(8) num_subpics_minus1;
    for (i = 0; i <= num_subpics_minus1; i++)
    {
        unsigned int(16) subpic_id;
        unsigned int(16) groupID; INDICATE group_id INCLUDING subpicture OF //subpic_id
    }
}
```

FIG. 17

```
aligned(8) class VvcSubpicIDEntry() extends VisualSampleGroupEntry('spid')
{
    unsigned int (7) reserved;
    unsigned int (1) all_subpic_id_is_same_as_groupID_flag; ALLOW TO OMIT IN CASE OF //subpic_id==groupID
    unsigned int(8) num_subpics_minus1;
    for (i = 0; i <= num_subpics_minus1; i++)
    {
        unsigned int(16) subpic_id;
        if(!all_subpic_id_is_same_as_groupID_flag){
            unsigned int(16) groupID; INDICATE group_id INCLUDING subpicture OF //subpic_id
        }
    }
}
```

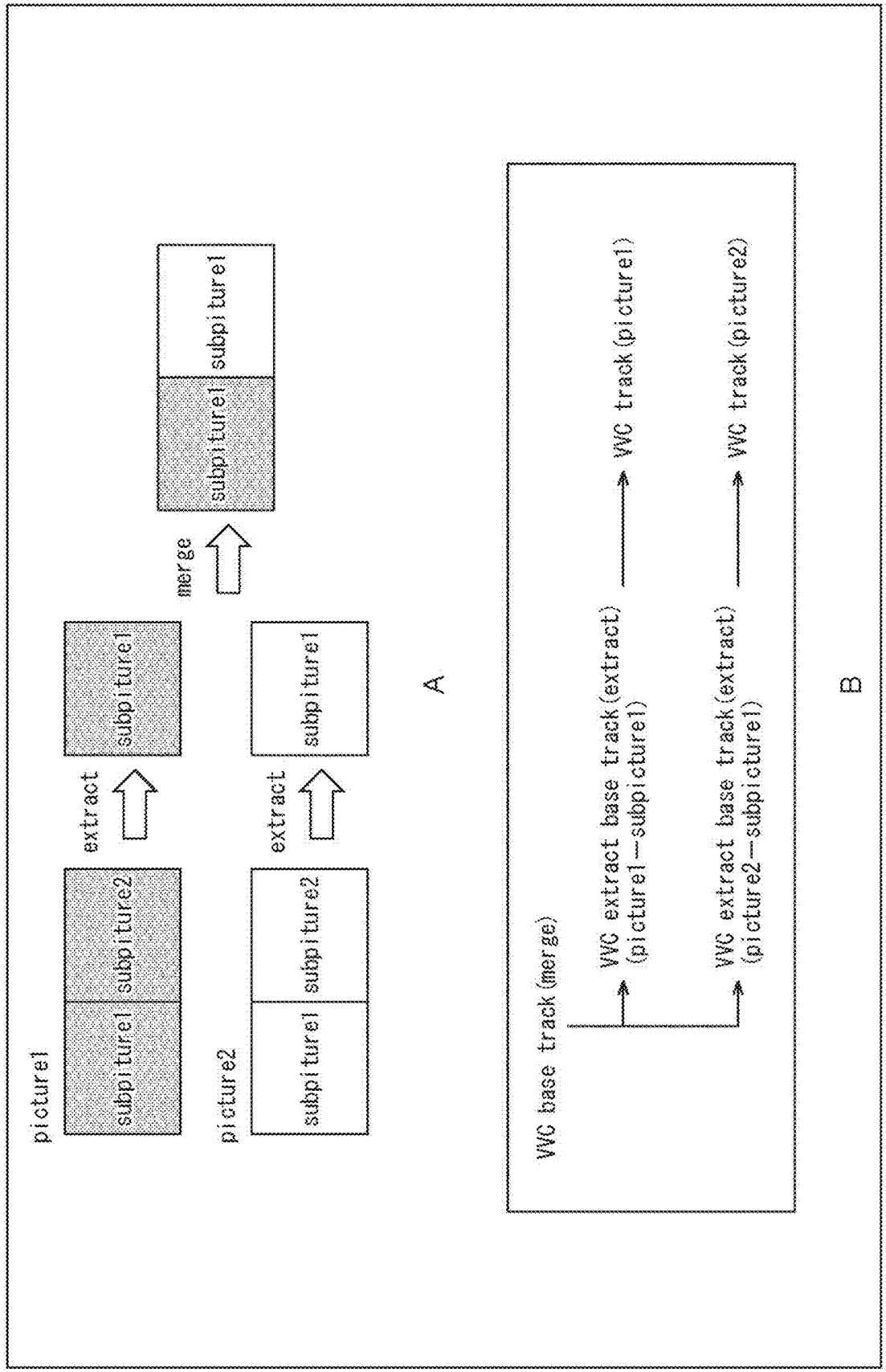

FIG. 19

```
aligned(8) class VvcSubpicOrderEntry() extends VisualSampleGroupEntry('spor')
{
    unsigned int(1) extract_track_exist_flag;
    unsigned int(7) reserved;
    unsigned int(1) subpic_id_info_flag;
    unsigned int(15) num_subpic_ref_idx;
    for (i = 0; i < num_subpic_ref_idx; i++)
        unsigned int(16) subp_track_ref_idx;
    if (subpic_id_info_flag) {
        unsigned int(4) subpic_id_len_minus1;
        unsigned int(12) subpic_id_bit_pos;
        unsigned int(1) start_code_emul_flag;
        unsigned int(1) pps_subpic_id_flag;
        if (pps_subpic_id_flag)
            unsigned int(6) pps_id;
        else {
            unsigned int(1) sps_subpic_id_flag;
            unsigned int(4) sps_id;
            bit(1) reserved = 0;
        }
    }
}
```

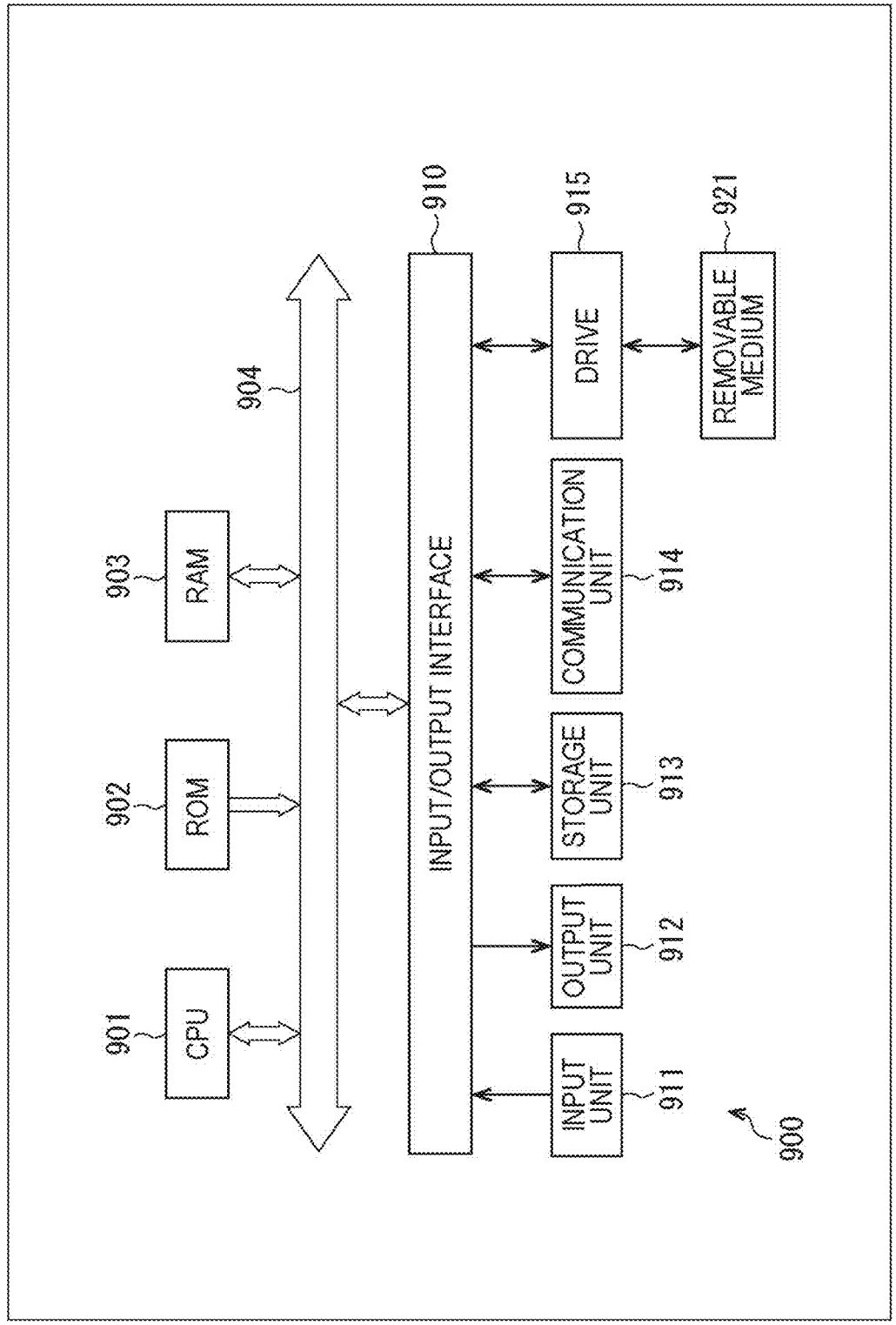

INFORMATION PROCESSING APPARATUS AND METHOD

CROSS-REFERENCE TO RELATED APPLICATIONS

The present application is based on PCT/JP2021/032228, filed on Sep. 2, 2021, which claims priority to U.S. Provisional Patent Application Nos. 63/078,573, filed Sep. 15, 2020, and 63/118,797, filed Nov. 27, 2020, the entire contents of each are incorporated herein by reference.

TECHNICAL FIELD

The present disclosure relates to an information processing apparatus and a method, and more particularly, to an information processing apparatus and a method capable of suppressing an increase in load of reproduction processing.

BACKGROUND ART

Conventionally, each image (picture) is divided into one or more slices in versatile video coding (VVC) of a standard specification of an image coding system. Furthermore, each picture can also be divided into one or more subpictures (see, for example, Non-Patent Document 1). Furthermore, as a method of storing a file of a picture encoded by VVC, a VVC file format using an international organization for standardization base media file format (ISOBMFF), which is a file container specification of moving picture experts group-4 (MPEG-4), an international standard technology for video compression, is being formulated (for example, see Non-Patent Documents 2 to 4).

Moreover, there is video-based point cloud compression (V-PCC) in which a point cloud, which is a set of points having position information and attribute information (color, reflection, or the like) at the same time in a three-dimensional space, is segmented to form a region, an attribute image (color information or the like) and a geometry image (constituted by depth information) are generated by plane-projecting the point cloud for each region, an ocular map image and atlas information (information for reconstructing the point cloud from a patch) are generated, and three images are encoded by a moving image codec. Then, for the purpose of improving the efficiency of reproduction processing and network distribution from a local storage of a bitstream (referred to as a V3C bitstream) encoded by the V-PCC, a technology of storing the V3C bitstream in ISOBMFF has been proposed (for example, see Non-Patent Document 5).

In the above-described VVC file format, a plurality of subpictures can be stored in one track (VVC track) and reproduced.

CITATION LIST

Non-Patent Document

Non-Patent Document 1: Benjamin Bross, Jianle Chen, Shan Liu, Ye-Kui Wang, "Versatile Video Coding (Draft 10)", JVET-S2001-vH, Joint Video Experts Team (JVET) of ITU-T SG 16 WP 3 and ISO/TEC JTC 1/SC 29/WG 11 19th Meeting: by teleconference, 22 June-1 Jul. 2020
Non-Patent Document 2: "Information technology—Coding of audio-visual objects—Part 15:Carriage of network abstraction layer (NAL) unit structured video in the ISO base media file format—Amendment 2: Carriage of VVC and EVC in ISOBMFF", ISO/IEC JTC 1/SC 29/WG 11, ISO/IEC 14496-15:2019(E) Amendment 2, 2020 Jul. 30
Non-Patent Document 3: "Information technology—Coding of audio-visual objects—Part 15: Carriage of network abstraction layer (NAL) unit structured video in the ISO base media file format", ISO/IEC JTC 1/SC 29/WG 11, 2019 September
Non-Patent Document 4: "Information technology—Coding of audio-visual objects—Part 12: ISO base media file format", ISO/IEC JTC 1/SC 29/WG 11, 2015 December
Non-Patent Document 5: "Information technology—Coded representation of immersive media—Part 10: Carriage of Visual Volumetric Video-based Coding Data", ISO/IEC JTC1/SC 29/WG 11, ISO 23090-10:2020(E), 2020 Aug. 23

SUMMARY OF THE INVENTION

Problems to be Solved by the Invention

However, in order to reproduce some subpictures in the track (VVC track), it is necessary to analyze and generate a parameter set of the VVC bitstream, and there is a possibility of a load of reproduction processing increasing.

The present disclosure has been made in view of such a situation, and an object thereof is to suppress an increase in load of reproduction processing.

Solutions to Problems

An information processing apparatus of an aspect of the present technology is an information processing apparatus including a file generation unit configured to generate a file storing a bitstream track storing a bitstream of content having a subpicture in a frame, and an extract base track storing subpicture specifying information that is information for specifying the subpicture to be extracted in the bitstream track.

An information processing method of an aspect of the present technology is an information processing method including generating a file storing a bitstream track storing a bitstream of content having a subpicture in a frame, and an extract base track storing subpicture specifying information that is information for specifying the subpicture to be extracted in the bitstream track.

An information processing apparatus of another aspect of the present technology is an information processing apparatus including a bitstream generation unit configured to extract a subpicture from a bitstream track and generate a bitstream on the basis of the extract base track of a file storing a bitstream track storing a bitstream of content having a subpicture in a frame, and an extract base track storing subpicture specifying information that is information for specifying the subpicture to be extracted in the bitstream track.

An information processing method of another aspect of the present technology is an information processing method including extracting a subpicture from a bitstream track and generating a bitstream on the basis of the extract base track of a file storing a bitstream track storing a bitstream of content having a subpicture in a frame, and an extract base track storing subpicture specifying information that is information for specifying the subpicture to be extracted in the bitstream track.

In the information processing apparatus and the method according to one aspect of the present technology, a file storing a bitstream track storing a bitstream of content having a subpicture in a frame, and an extract base track storing subpicture specifying information that is information for specifying a subpicture to be extracted in the bitstream track is generated.

In the information processing apparatus and the method of another aspect of the present technology, a subpicture is extracted from a bitstream track and a bitstream is generated, on the basis of the extract base track of a file storing a bitstream track storing a bitstream of content having a subpicture in a frame, and an extract base track storing subpicture specifying information that is information for specifying the subpicture to be extracted in the bitstream track.

BRIEF DESCRIPTION OF DRAWINGS

FIG. 2 is a diagram illustrating an example of syntax of a sequence parameter set.

FIG. 3 is a diagram illustrating an example of syntax of a picture parameter set.

FIG. 4 is a diagram illustrating an example of syntax of a picture parameter set.

FIG. 6 is a diagram illustrating an example of a subpicture order sample group.

FIG. 7 is a diagram illustrating an example of a subpicture ID sample group.

FIG. 9 is a diagram illustrating an example of a tile region sample group.

FIG. 10 is a diagram illustrating an example of a NAL unit map sample group.

FIG. 11 is a diagram illustrating a use case of a subpicture.

FIG. 13 is a diagram illustrating a method of signaling reconstruction information using a VVC extract base track.

FIG. 15 is a diagram illustrating an example of a subpicture extraction sample group.

FIG. 16 is a diagram illustrating an example of the subpicture ID sample group.

FIG. 17 is a diagram illustrating an example of the subpicture ID sample group.

FIG. 18 is a diagram illustrating a combination of a VVC base track and the VVC extract base track.

FIG. 19 is a diagram illustrating an example of the subpicture order sample group.

FIG. 25 is a block diagram illustrating a main configuration example of a computer.

MODE FOR CARRYING OUT THE INVENTION

Hereinafter, modes for carrying out the present disclosure (hereinafter referred to as embodiments) will be described. Note that the description will be given in the following order.

1. Reproduction of Partial Subpicture
2. Extract Base Track
3. Extension of Subpicture ID Sample Group
4. Combination of VVC Base Track and VVC Extra Base Track
5. Application of V3C File Format
6. First Embodiment (File Generation Device)
7. Second Embodiment (Reproduction Device)
8. Appendix 1. Reproduction of Partial Subpicture Documents Supporting Technical Content and Technical Terms or the Like The scope disclosed in the present technology includes not only the content described in the embodiments but also the content described in the following Non-Patent Documents and the like known at the time of filing, the content of other documents referred to in the following Non-Patent Documents, and the like.

Non-Patent Document 1: (described above)
Non-Patent Document 2: (described above)
Non-Patent Document 3: (described above)
Non-Patent Document 4: (described above)
Non-Patent Document 5: (described above)

That is, the content described in the above-describe Non-Patent Documents, the content of other documents referred to in the above-described Non-Patent Documents, and the like are also grounds for determining the support requirement.

VVC Bitstream>

Conventionally, in versatile video coding (VVC) of a standard specification of an image coding method, each image (picture) is divided into one or more slices, for example, as described in Non-Patent Document 1. Furthermore, each picture can also be divided into one or more subpictures.

Figure 1:
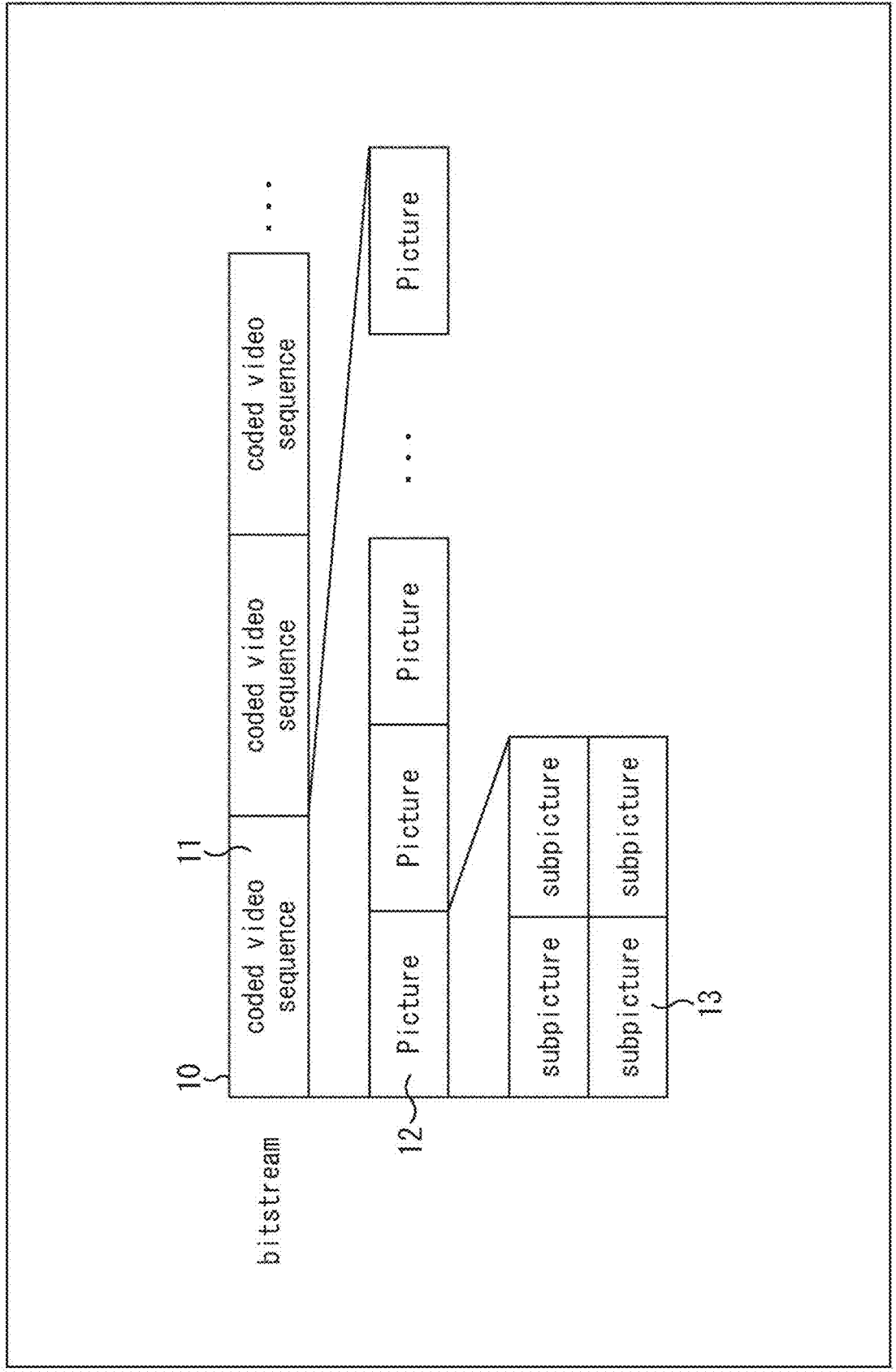
FIG. 1 is a diagram illustrating a main configuration example of a VVC bitstream.

FIG. 1 is a diagram illustrating a main configuration example of a bitstream (also referred to as a VVC bitstream) obtained by encoding image data by VVC. As illustrated in FIG. 1, a VVC bitstream 10 includes a set (a single or a plurality of coded video sequences 11) of coded video sequences 11 obtained by encoding one moving image. Further, the coded video sequence 11 includes a set of encoded data of pictures 12 (encoded data of a single or a plurality of pictures 12) which are single frames of the moving image. Each picture 12 may be divided into a plurality of subpictures 13.

That is, the subpicture 13 is a rectangular region obtained by dividing a rectangular picture 12. There is no pixel having no encoded data in the picture 12. There is no overlap between the subpictures 13. There is no pixel that is not included in any subpicture 13 among the pixels of the picture 12.

The subpicture 13 can be independently decodable. That is, a single or a plurality of subpictures 13 can be independently decoded. For example, only a part of the encoded data of the subpicture 13 constituting the picture 12 may be decoded. In this case, the encoded data of the subpicture 13 to be decoded is extracted from the VVC bitstream 10, and a parameter set and the like are added to generate a new bitstream (the bitstream is reconstructed).

FIG. 2 illustrates an example of syntax of a sequence parameter set of the VVC bitstream 10. The sequence parameter set is a parameter set (metadata that does not change in the coded video sequence 11) for each coded video sequence 11. FIG. 2 illustrates syntax of a part of the sequence parameter set.

As illustrated in FIG. 2, the sequence parameter set includes "resolution information of a picture" configured by parameters related to the resolution of the picture 12. For example, this "resolution information of a picture" includes a parameter (sps_pic_width_max_in_luma_samples, sps_pic_height_max_in_luma sample, or the like) indicating the maximum value of the resolution of the picture 12 in the coded video sequence 11.

Furthermore, the sequence parameter set includes "layout information of a subpicture" configured by parameters related to the layout of the subpicture 13. For example, the "layout information of the subpicture" includes a parameter (sps_subpic_ctu_top_left_x[i], sps_subpic_ctu_top_left_y [i], or the like) indicating the position of the subpicture 13. Furthermore, the "layout information of the subpicture" includes a parameter (sps_subpic_width_minus1[i], sps_subpic_height_minus1[i], or the like) indicating the resolution of the subpicture 13. Further, the "layout information of the subpicture" includes a parameter (sps_subpic_treated_as_pic_flag[i], sps_loop_filter_across_subpic_enabled_flag[i], or the like) related to independent decoding of the subpicture 13.

Moreover, the sequence parameter set includes a "layout omission flag of a subpicture" configured by information regarding omission of the "layout information of a subpicture". For example, the "layout omission flag of the subpicture" includes flag information (sps_independent_subpic_flag) indicating whether or not all the subpictures 13 are independently decodable, flag information (sps_subpic_same_size_flag) indicating whether or not all the subpictures 13 have the same resolution, and the like. For example, in a case where all the subpictures 13 can be independently decoded and have the same resolution, regardless of the number of subpictures 13, one parameter related to the width and one parameter related to the height of the subpicture 13 are stored in the sequence parameter set.

Furthermore, the sequence parameter set includes "identification information of a subpicture" configured by parameters related to identification of the subpicture 13. For example, the "identification information of the subpicture" includes identification information (sps_subpic_id[i]) of each subpicture 13 included in the coded video sequence. For example, a number may be sequentially assigned to each subpicture in the sequence (for example, integer values increasing by "+1" are allocated, as in 0, 1, 2, . . . ), and the number may be used as the identification information of the subpicture 13. Note that there are three types of "identification information of a subpicture," that is, a case where the identification information of the subpicture is omitted, a case where the identification information of the subpicture is stored in the sequence parameter set, and a case where the identification information of the subpicture is stored in the picture parameter set.

In a case where some subpictures 13 are extracted from such a VVC bitstream 10 and decoded, since the number of subpictures included in the coded video sequence 11 changes, "identification information of a subpicture" and "layout information of a subpicture" can change. That is, in this case, it is necessary to update the sequence parameter set of the VVC bitstream 10 (coded video sequence 11) and generate the sequence parameter set corresponding to the bitstream of the extracted subpicture.

Furthermore, FIGS. 3 and 4 illustrate examples of syntax of a picture parameter set of the VVC bitstream 10 in FIG. 1. The picture parameter set is a parameter set (metadata that does not change in picture 12) for each picture 12. In FIGS. 3 and 4, syntax of a part of the picture parameter set is illustrated.

As illustrated in FIG. 3, the picture parameter set includes "resolution information of a picture" configured by parameters related to the resolution of the picture 12. For example, the "resolution information of a picture" includes a parameter (pps_pic_width_in_luma_samples, pps_pic_heigh_in_luma_samples, or the like) indicating the resolution of the picture 12.

Furthermore, the picture parameter set includes "identification information of a subpicture" configured by parameters related to identification of the subpicture 13. For example, the "identification information of the subpicture" includes identification information pps_subpic_id[i]) of each subpicture 13 included in the picture 12. For example, a number may be sequentially assigned to each subpicture 13 in the picture 12 (for example, integer values increasing by "+1" are allocated, as in 0, 1, 2, . . . ), and the number may be used as the identification information of the subpicture 13.

Moreover, the picture parameter set includes tile information configured by parameters related to the configuration of tiles in the picture 12. If tiles having the same width or height continue to the edge of the screen, this tile information may be omitted.

Furthermore, as illustrated in FIG. 4, the picture parameter set includes slice information (slice information) configured by parameters related to a configuration of a slice in a picture. In a case where all the subpictures 13 are configured by one slice, this slice information may be omitted.

In a case where some subpictures 13 are extracted from such the VVC bitstream 10 and decoded, since the configuration of the subpictures in the picture changes, the above-described information of the picture parameter set may change. That is, in this case, it is necessary to update the picture parameter set of the VVC bitstream 10 (picture 12) and generate the picture parameter set corresponding to the bitstream of the extracted subpicture.

VVC File Format

Meanwhile, as a method of storing a file of a picture encoded by VVC, for example, as described in Non-Patent Document 2 to Non-Patent Document 4, a VVC file format using an international organization for standardization base media file format (ISOBMFF) which is a file container specification of the international standard technology for video compression moving picture experts group-4 (MPEG-4) is being developed.

Figure 5:
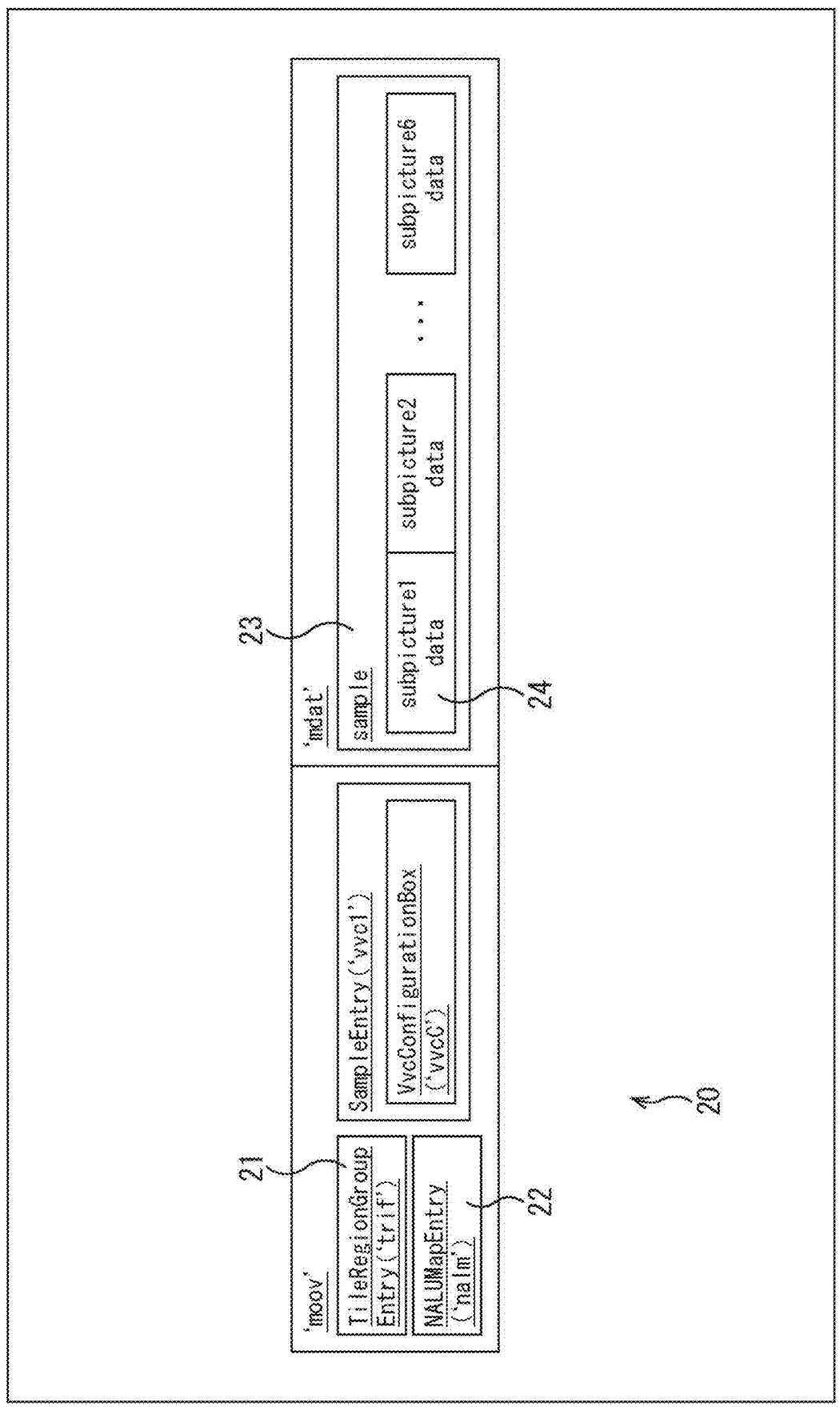
FIG. 5 is a diagram illustrating a main configuration example of the VVC track.

FIG. 5 is a diagram illustrating a configuration example of a track of the VVC file format. As illustrated in FIG. 5, the VVC track 20 is a track for storing the VVC bitstream, and includes a moov box and an mdat box. The moov box stores metadata and the like related to the track, and the mdat box stores the VVC bitstream.

In a case where a plurality of subpictures is configured in a picture, in this VVC file format, for example, the subpictures in the picture can be stored in a plurality of tracks, or can be collectively stored in one track.

For example, in a case where a subpicture is divided into a plurality of tracks and stored, independent decoding of some subpictures can be realized by selecting a track to be decoded at the time of decoding. In that case, the information (metadata) regarding the merge of the selected track is stored in a track different from the track storing the bitstream of the subpicture. This track is also referred to as a VVC base track. Furthermore, a track storing the bitstream of the subpicture is also referred to as a VVC subpicture track.

FIG. 6 illustrates an example of syntax of a VVC subpicture order entry (VvcSubpicOrderEntry) stored in the VVC base track in a case where a subpicture is divided into a plurality of tracks and stored. As illustrated in FIG. 6, in the VVC base track, VisualSampleGroupEntry is extended to generate a VVC subpicture order entry (VvcSubpicOrderEntry( ) extends VisualSampleGroupEntry('spor')). The VVC subpicture order entry stores information defining a subpicture order sample group which is a group of subpictures to be reconstructed. The subpicture order sample group can include information such as "the number of subpictures" indicating the number of subpictures to be merged, "the decoding order of the subpictures" indicating the decoding order of the subpictures to be merged, and "rewriting information of a subpicture ID" which is information related to rewriting of identification information of the subpictures. For example, subp_track_ref_idx indicates a track or a track group including a subpicture to be merged. Furthermore, subpic_id_info_flag indicates the presence or absence of "rewriting information of the subpicture ID".

Furthermore, FIG. 7 illustrates an example of syntax of the VVC subpicture ID entry (VvcSubpicIDEntry) stored in a VVC subpicture track in a case where a subpicture is divided into a plurality of tracks and stored. As illustrated in FIG. 7, in the VVC subpicture track, VisualSampleGroupEntry is extended to generate the VVC subpicture ID entry (VvcSubpicIDEntry( ) extends VisualSampleGroupEntry ('spid')). The VVVC subpicture ID entry stores information defining a subpicture ID sample group which is a group of subpicture identification information (subpic_id) included in the sample of the VVC subpicture track. The subpicture ID sample group indicates identification information (subpic_id) of the subpictures included in the track in decoding order.

As described above, the subpictures in the picture can be collectively stored in one track. The VVC track in the example of FIG. 5 stores a bitstream of a picture including six subpictures as a sample 23 in the mdat box. That is, the sample 23 includes the bitstreams 24 (subpicture1 data to subpicture6 data) of six subpictures.

In this case, a tile region loop entry (TlieRegionGroupEntry(trif)) 21 and a null unit map entry (NALUMapEntry (nalm)) 22 are formed in the moov box of the VVC track 20.

The tile region loop entry 21 stores information defining a tile region sample group which is a sample group indicating a tile region of a picture. The null unit map entry 22 stores information defining a null unit map sample group (NAL unit map sample group) which is a sample group for classifying the null unit (NAL unit) included in the sample 23 for each tile region.

Figure 8:
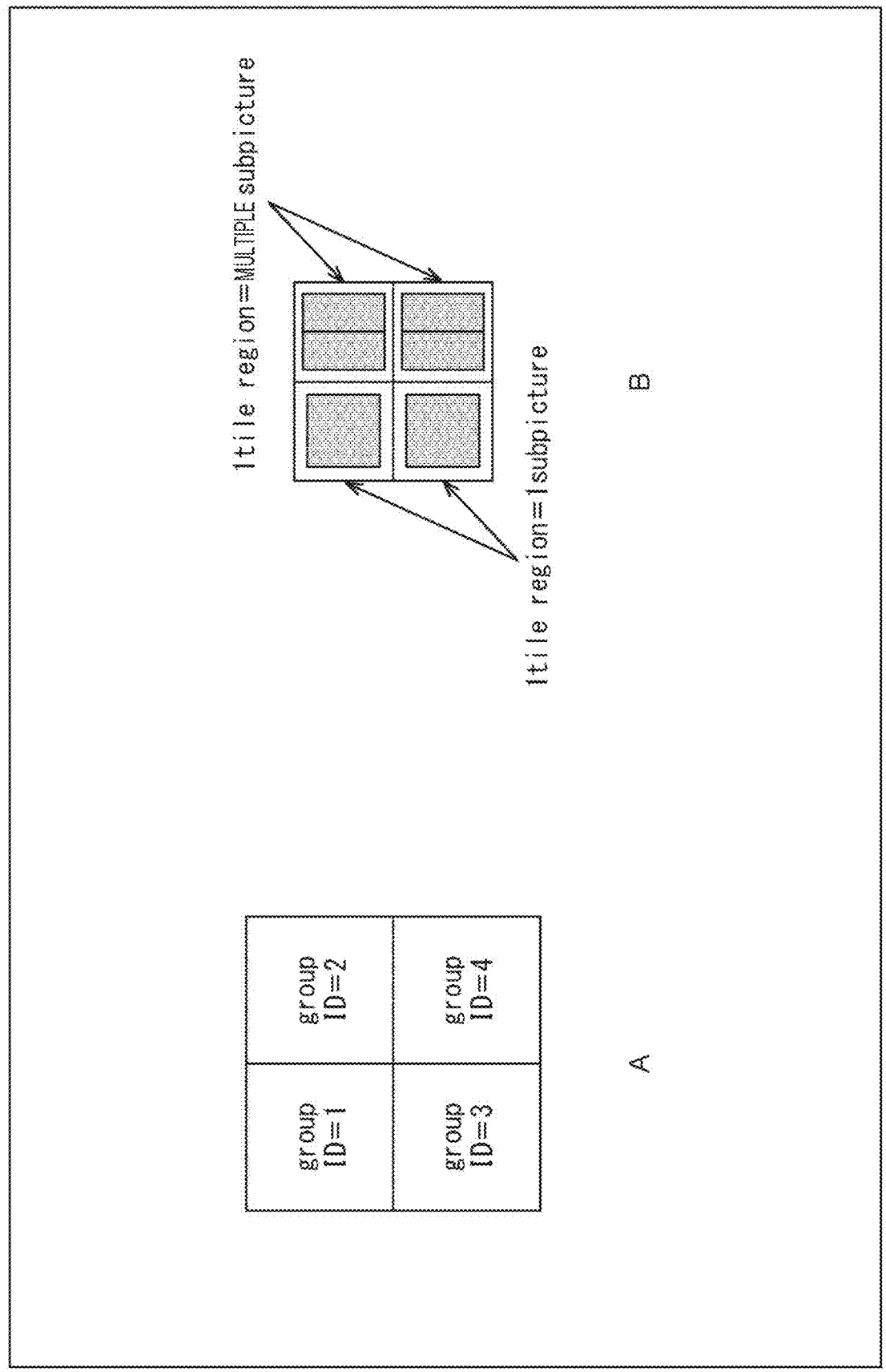
FIG. 8 is a diagram illustrating a tile region.

In the tile region loop entry 21, a groupID is stored as the identifier. That is, the groupID is identification information of the tile region. For example, in a case where four tile regions are formed in a picture as illustrated in A of FIG. 8, different groupIDs are assigned to the respective regions (groupID=1 to groupID=4). The tile region loop entry 21 also stores information specifying (the position and size of) the tile region. In VVC, one tile region may contain one or more subpictures. That is, as illustrated in B of FIG. 8, one tile region may be configured by one subpicture or may be configured by a plurality of subpictures.

FIG. 9 illustrates an example of syntax of the tile region loop entry 21. As illustrated in FIG. 9, the tile region loop entry 21 stores an identifier (groupID) of the tile region loop entry 21, a parameter (horizontal offset, vertical offset) indicating a position of a tile region, a parameter (region width, region height) indicating a size of a tile region, a parameter (dependency tile count, dependencyTileGroupID) indicating a dependency relation between tile regions, and the like.

The null unit map entry 22 stores information indicating a correspondence between a null unit and a group ID. Since the groupID is given to the tile region as described above, the null unit corresponds to any groupID as illustrated in A of FIG. 10. A correspondence between the null unit and the group ID is indicated in the null unit map entry 22. An example of syntax of the null unit map entry 22 is illustrated in B of FIG. 10. As illustrated in FIG. 10, information (NALU start number) indicating a null unit corresponding to each group ID is illustrated.

Use Case: Omnidirectional Video

FIG. 11 is a diagram illustrating a use case of applying a subpicture. For example, as illustrated in A of FIG. 11, a video of each side of the omnidirectional video content (of Cubemap) including videos in six directions of up, down, left, right, front, and back may be used as a subpicture. In the case of such omnidirectional video content, there are various cases such as a case where only one of six surfaces is decoded, a case where only two surfaces are decoded, . . . , and a case where all six surfaces are decoded.

Therefore, as illustrated in B of FIG. 11, videos of all surfaces are stored in one VVC track, and some subsamples can be appropriately extracted, so that each case described above can be handled.

Use Case: V3C Bitstream

Furthermore, there is video-based point cloud compression (V-PCC) in which a point cloud, which is a set of points having position information and attribute information (color, reflection, or the like) at the same time in a three-dimensional space, is segmented to form a region, an attribute image (color information or the like) and a geometry image (constituted by depth information) are generated by plane-projecting the point cloud for each region, an ocular map image and atlas information (information for reconstructing the point cloud from a patch) are generated, and three images are encoded by a moving image codec. Non-Patent Document 5 discloses a technique of storing a V3C bitstream in ISOBMFF for the purpose of improving the efficiency of reproduction processing and network distribution of a bitstream (referred to as a V3C bitstream) encoded by such V-PCC from a local storage.

The video based point cloud data (V3C) file format (V3C File Format) is a file format using an ISO base media file storing V-PCC. The V3C file format is capable of storing point cloud data in a plurality of tracks (V3C track, occ, geo, att), for example, as illustrated in A of FIG. 12. In this case, metadata for reconstructing the point cloud is included in the V3C track. Moreover, the V3C track is a track (video component track) including a video component of each of the occupancy map, the geometry, and the attribute of the V-PCC.

Figure 12:
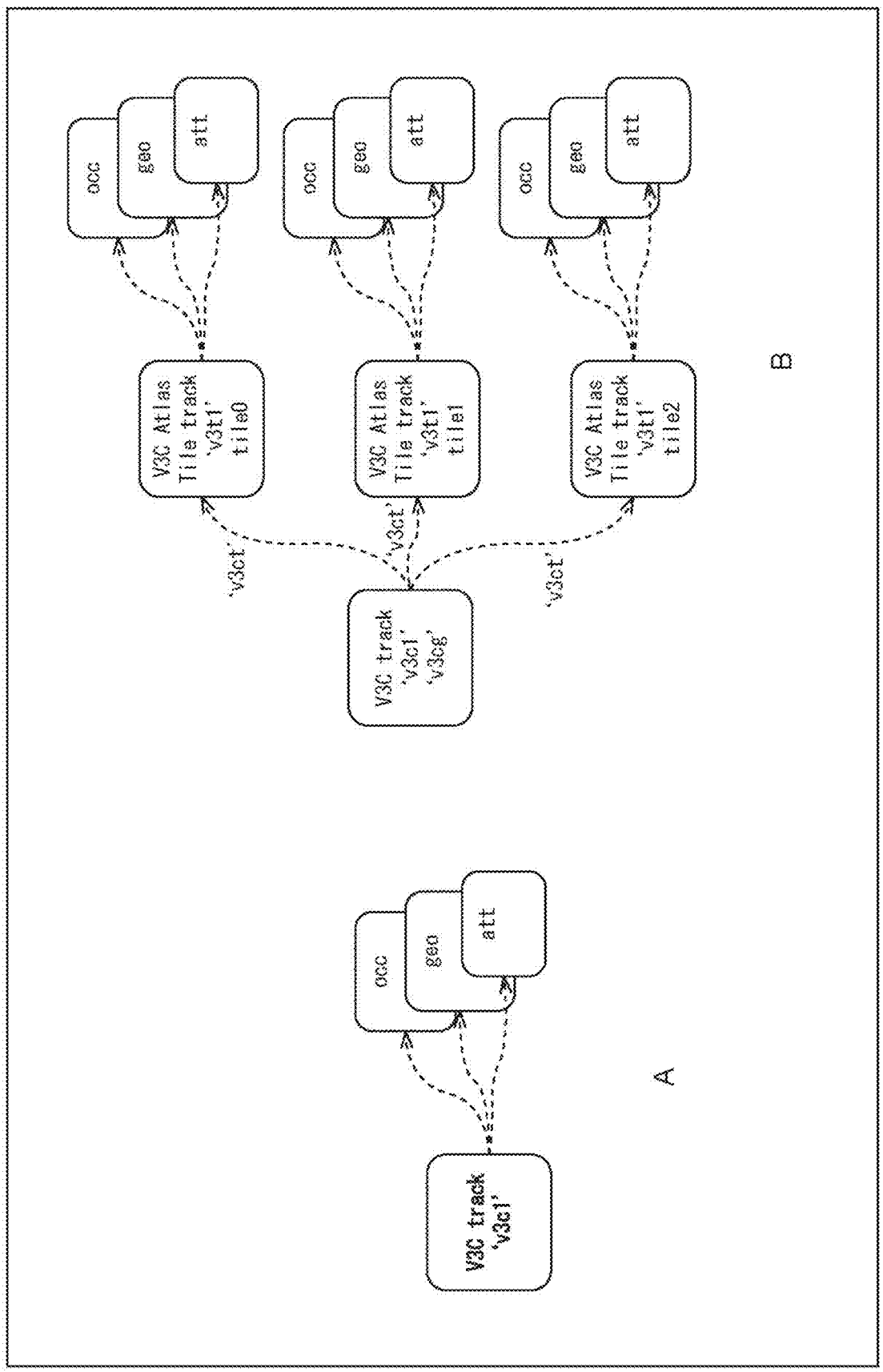
FIG. 12 is a diagram illustrating an example of a V3C File Format.

Furthermore, the V3C file format can separate tracks for each partial area, for example, as illustrated in B of FIG. 12, in order to enable partial access of point cloud data (independently decoding a partial area of a point cloud). In that case, the following track configuration is possible. The V3C track is a V3C atlas tile track for a partial region. Each V3C atlas tile track is a respective video component track of an occupancy map, geometry, and an attribute included in its atlas tile. Each video component track may, for example, store and independently decode a VVC bitstream. In the case of VVC bitstreams, the VVC file format is applied to each video component track.

Even in the case of the content of such the V3C file format, in order to realize partial access, setting each partial area as a subpicture, storing all the partial areas in one VVC track, and enabling some subpictures to be appropriately extracted is conceivable.

Reconstruction of Parameter Set

As described above, in the VVC file format, a plurality of subpictures can be stored in one track, and some of the subpictures can be extracted and decoded. However, in this case, one bitstream is reconstructed using the extracted subpicture, and the bitstream is decoded. Since the configuration of the subpicture is different between the bitstream before reconstruction and the bitstream after reconstruction, the parameter set (for example, the sequence parameter set or the picture parameter set) cannot be used as it is. Therefore, it is necessary to derive the parameter set corresponding to the bitstream after the reconstruction, for example, by updating the parameter set before the reconstruction.

That is, it is necessary to perform complicated work such as analyzing the bitstream before reconstruction and the parameter set thereof, updating the parameter set, and deriving the parameter set corresponding to the bitstream after reconstruction, which may increase the load of the reproduction processing. Note that, the reproduction processing includes at least processing of decoding a bitstream of content stored in a file and processing related to the decoding (for example, processing of reconstructing a bitstream to be decoded, or the like). Furthermore, processing of generating a display image using data obtained by decoding may be included in the reproduction processing, or other processing may be included.

For example, in a case where a file of content having a plurality of subpictures is distributed from a server, and a client device generates a display image by decoding only some subpictures stored in the file, there is a possibility of a load on the client device increasing. Generally, the processing capability of the client device is lower than that of the server. Therefore, there is a possibility of the processing being delayed or failing due to such an increase in load. In other words, in order to prevent a processing delay or failure from occurring, it is necessary to increase the processing capacity of the client device, which may increase the cost.

Note that, as described above, in the case of the method of storing each subpicture in a plurality of tracks, it is possible to store parameter sets necessary for bitstream reconstruction using the VVC base track. However, in the VVC base track, a desired subpicture cannot be extracted from a plurality of subpictures existing in the track.

2. Extract Base Track

Method 1

Therefore, as illustrated in the uppermost row of the table in FIG. 13, the VVC extract base track having reconstruction information such as a parameter set necessary for reconstructing a bitstream from some subpictures is provided and stored in a file (Method 1). Then, in a case where some subpictures are reproduced, a reconstructed bitstream is generated on the basis of the information stored in the VVC extract base track.

Figure 14:
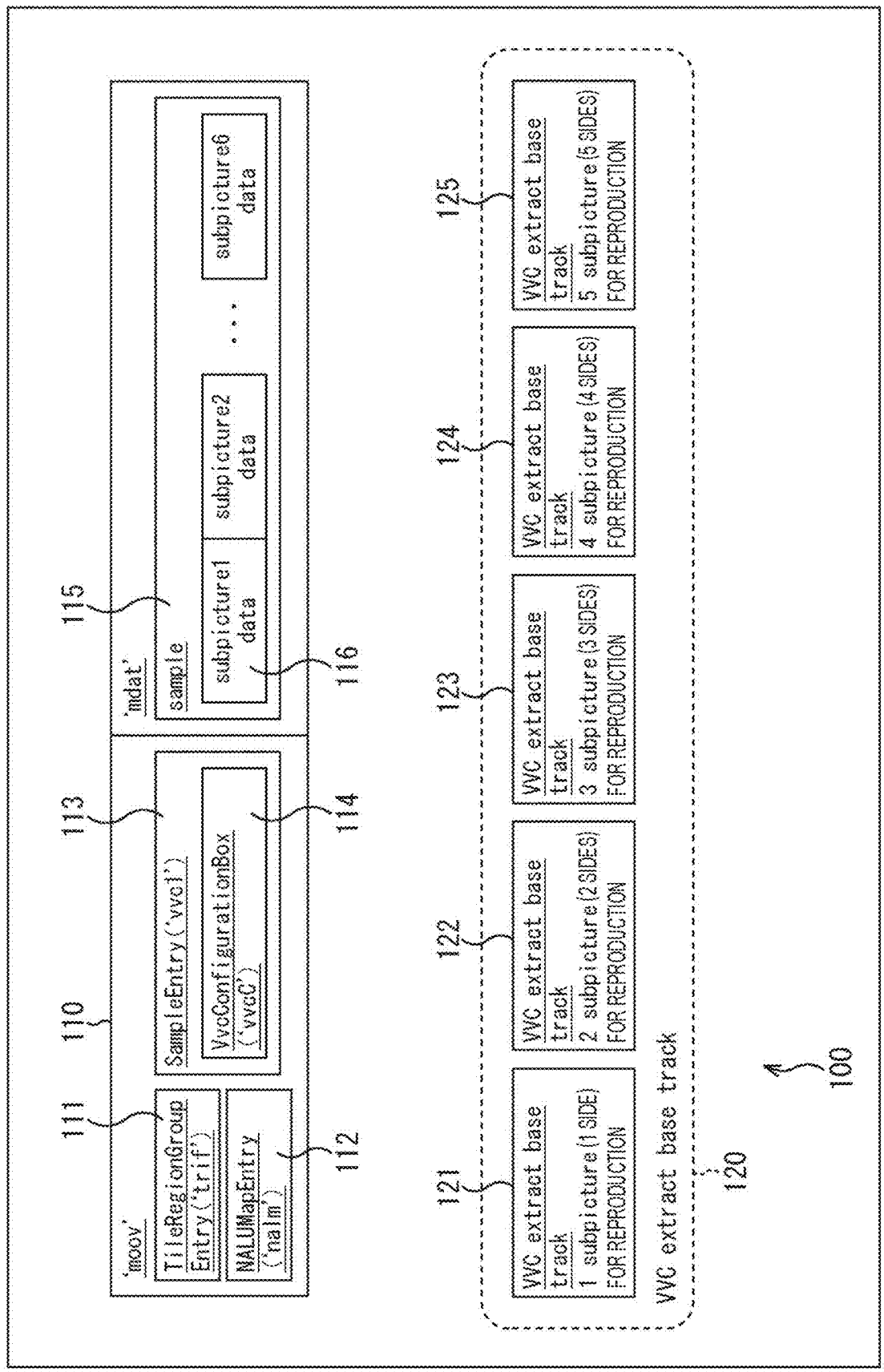
FIG. 14 is a diagram illustrating a configuration example of a file storing the VVC extract base track.

FIG. 14 is a diagram illustrating a main configuration example of a file to which the present technology is applied. A file 100 illustrated in FIG. 14 is a file conforming to a VVC file format for storing a VVC bitstream in ISOBMFF. As illustrated in FIG. 14, the file 100 has a VVC bitstream track 110 and a VVC extract base track 120.

The VVC bitstream track 110 is a track storing the VVC bitstream, similarly to the VVC track 20 described above. The VVC bitstream track 110 may store a VVC bitstream having a plurality of subpictures. In the case of this example, in the mdat box of the VVC bitstream track 110, a bitstream of a picture including six subpictures is stored as a sample 115. That is, the sample 115 includes a bitstream 116 (subpicture1 data to subpicture6 data) of six subpictures.

Furthermore, a tile region loop entry (TlieRegionGroupEntry(trif)) 111 and a null unit map entry (NALUMapEntry(nalm)) 112 are stored in the moov box of the VVC bitstream track 110. Similarly to the tile region loop entry 21 described above, information defining a tile region sample group is stored in the tile region loop entry 111. Similarly to the null unit map entry 22 described above, the null unit map entry 112 stores information indicating a correspondence between a null unit and a group ID.

Moreover, a sample entry (SampleEntry(vvc1)) 113 is stored in the moov box of the VVC bitstream track 110. The sample entry 113 stores a VVC configuration box (VvcConfigurationBox) 114.

The VVC extract base track 120 stores reconstruction information necessary for reconstructing a bitstream from some subpictures. The reproduction device can extract the bitstream 116 of a desired subpicture from the VVC bitstream track 110 on the basis of the reconstruction information stored in the VVC extract base track 120, and reconstruct the extracted bitstream of the subpicture.

For example, the reproduction device first determines a region to be reproduced on the basis of the information stored in the tile region loop entry 111 of the VVC bitstream track 110. Therefore, the groupID indicating the region to be reproduced is determined. Next, the reproduction device searches the VVC extract base track 120 including the area to be reproduced.

Then, the reproduction device updates (rewrites) the parameter set (such as the sequence parameter set and the picture parameter set) on the basis of the information stored in the searched VVC extract base track 120. Then, the reproduction device extracts the null unit of the region to be reproduced from the sample 115 using the null unit map sample group defined in the null unit map entry 112 of the VVC bitstream track 110, and reconstructs the sample using the information stored in the VVC extract base track 120.

As described above, the reproduction device can easily reconstruct the bitstream without analyzing the VVC bitstream stored in the VVC bitstream track 110. Therefore, an increase in the load of the reproduction processing can be suppressed.

Note that, in the case of the example of FIG. 14, the file 100 includes, as the VVC extract base track 120, a VVC extract base track 121 storing reconstruction information for reproduction of one subpicture (1-sided), a VVC extract base track 122 that stores reconstruction information for reproduction of two subpictures (2-sides), a VVC extract base track 123 storing reconstruction information for reproduction of three subpictures (3-sided), a VVC extract base track 124 storing reconstruction information for reproduction of four subpictures (4-sided), and a VVC extract base track 125 storing reconstruction information for reproduction of five subpictures (5-sided). In this manner, the VVC extract base track may be generated for each number of subpictures to be reconstructed.

Method 1-1

Note that, as illustrated in the second row from the top of the table in FIG. 13, a track used for reproduction and extraction information stored in the track and specifying a subpicture to be reproduced may be stored in the VVC extract base track (Method 1-1). Then, in a case where some subpictures are reproduced, a reconstructed bitstream may be generated on the basis of the extraction information stored in the VVC extract base track.

For example, the VVC extract base track 120 may store, as the reconstruction information, subpicture specifying information that is information for specifying a subpicture to be extracted in the VVC bitstream track 110.

For example, in an information processing method, a file storing a bitstream track storing a bitstream of content having a subpicture in a frame and an extract base track storing subpicture specifying information that is information for specifying a subpicture to be extracted in the bitstream track is generated.

For example, an information processing apparatus includes a file generation unit that generates a file storing a bitstream track storing a bitstream of content having a subpicture in a frame, and an extract base track storing subpicture specifying information that is information for specifying a subpicture to be extracted in the bitstream track.

By doing so, a file including the extract base track that stores the subpicture specifying information is generated. Therefore, the reproduction device can extract a desired subpicture from the bitstream track on the basis of the extract base track and reconstruct the bitstream. That is, the reproduction device can easily reconstruct the bitstream without analyzing the bitstream. Therefore, an increase in the load of the reproduction processing can be suppressed.

Furthermore, for example, in an information processing method, a subpicture is extracted from a bitstream track and a bitstream is generated, on a basis of the extract base track of a file storing a bitstream track storing a bitstream of content having a subpicture in a frame, and an extract base track storing subpicture specifying information that is information for specifying the subpicture to be extracted in the bitstream track.

For example, an information processing apparatus includes a bitstream generation unit that extracts a subpicture from a bitstream track and generates a bitstream on the basis of an extract base track of a file storing a bitstream track storing a bitstream of content having the subpicture in a frame and an extract base track storing subpicture specifying information that is information for specifying the subpicture to be extracted in the bitstream track.

By doing so, it is possible to extract a desired subpicture from the bitstream track on the basis of the extract base track including the subpicture specifying information and to reconstruct the bitstream. That is, it can easily reconstruct the bitstream without analyzing the bitstream. Therefore, an increase in the load of the reproduction processing can be suppressed.

Note that the subpicture specifying information may include tile region identification information that is identification information of a tile region including the subpicture. For example, the groupID as described with reference to FIG. 8 may be used as the subpicture specifying information. By doing so, the reproduction device can more easily specify the tile region (subpicture) to be reproduced.

Method 1-1-1

Note that, as illustrated in the third row from the top of the table in FIG. 13, a sample group may be defined, and extraction information that allows the client to select one from a plurality of sets of subpictures may be stored in the sample group (Method 1-1-1). Then, in a case where some subpictures are reproduced, a set of subpictures to be extracted may be selected on the basis of the sample group.

For example, a visual sample group entry (VisualSampleGroupEntry(spex)) may be extended to generate a VVC subpicture extraction entry (VvcSubpictureExtractionEntry( ), and information defining a subpicture extraction sample group that is a sample group of subpictures to be extracted (to be reproduced) may be stored in the VVC subpicture extraction entry.

The subpicture extraction sample group can include, for example, information indicating groupID information (also referred to as a region set) of the tile region loop entry of the track of the candidate of the subpicture to be extracted. Note that, in a case where the tile region is directly designated, it is only required to store a region set including one tile region. Furthermore, the subpicture extraction sample group can include information (subpic_id rewriting information) related to rewriting (updating) of the subpicture identification information that is the identification information of the subpicture. As described above, by applying the region set, the reproduction device can more easily extract a plurality of tile regions. The reproduction device (client) selects and extracts one groupID from the region set of the subpicture extraction sample group.

FIG. 15 illustrates an example of syntax of the VVC subpicture extraction entry (VvcSubpictureExtractionEntry( ) in this case. In the case of the example of FIG. 15, the following parameters can be stored in the VVC subpicture extraction entry. num_region_set indicates the number of region sets. num_region_in_set indicates the number of tile regions included in the region set. groupID indicates a groupID indicating a tile region included in the region set. num_regions indicates the number of tile regions to be extracted. region_idx is designated using region_set_id or groupID which is identification information of a region set.

For example, the extract base track may set one set of subpictures extracted into one bitstream, and store the subpicture specifying information for each set.

Furthermore, the extract base track may further store set identification information which is identification information of the set.

By setting the region set as described above, it is possible to store the extraction information of a plurality of patterns in one VVC extract base track. That is, a plurality of combinations of subpictures to be extracted can be defined in one VVC extract base track. Therefore, the reproduction device can extract more various combinations of subpictures on the basis of such a VVC extract base track. That is, the extraction pattern (the number of combinations) of the subpicture can be increased without increasing the number of tracks.

Therefore, redundant tracks can be collected, and a reduction in encoding efficiency can be suppressed.

Note that, in the syntax example illustrated in FIG. 15, information after the line of "if (subpic_id_info_flag) {" is information regarding rewriting of the subpicture identification information. That is, information for updating the parameter sets such as the sequence parameter set and the picture parameter set so as to correspond to the reconstructed bitstream is stored in the VVC subpicture extraction entry. More specifically, information for updating the subpicture identification information included in the parameter set to correspond to the reconstructed bitstream is stored in the VVC subpicture extraction entry.

That is, the extract base track may further store parameter set update information that is information for updating the parameter set to correspond to the bitstream of the extracted subpicture.

For example, the parameter set update information may include subpicture update information that is information for updating subpicture identification information that is identification information of a subpicture to correspond to a bitstream of an extracted subpicture.

By doing so, the reproduction device can more easily make the parameter set correspond to the reconstructed bitstream on the basis of the information stored in the extract base track. For example, the reproduction device can more easily make the subpicture identification information included in the parameter correspond to the reconstructed bitstream on the basis of the information stored in the extract base track.

3. Extension of Subpicture ID Sample Group

Method 1-2

As illustrated in the fourth row from the top of the table in FIG. 13, the subpicture ID sample group may be extended, and mapping information indicating a correspondence between a subpicture and a tile region may be stored (Method 1-2). For example, as such mapping information, information indicating a tile region including a subpicture may be stored in the subpicture ID sample group.

For example, in the case of the subpicture ID sample group illustrated in FIG. 7, a relationship between a subpicture and a tile region (in which tile region a subpicture is included) is unknown. As described with reference to FIG. 8, since tile regions and subpictures do not always correspond one-to-one, there may be a case where a subpicture necessary for a desired tile region (groupID) cannot be specified on the basis of the subpicture extraction sample group illustrated in FIG. 15.

Therefore, in the subpicture ID sample group, the tile region (groupID) including the subpicture (subpic_id) is indicated.

FIG. 16 illustrates an example of syntax of VvcSubpicIDEntry( ) storing information defining the subpicture ID sample group in that case. As illustrated in FIG. 16, next to the subpicture identification information (subpic_id), the identification information (groupID) of the tile region including the subpicture corresponding to the subpicture identification information (subpic_id) is stored in VvcSubpicIDEntry( ). Therefore, the correspondence between the subpicture (subpic_id) and the tile region (groupID) is clearly indicated.

That is, the bitstream track may further store, for each subpicture stored in the bitstream track, the subpicture identification information and the tile region identification information of the tile region including the subpicture.

By doing so, the reproduction device can more easily specify the subpicture (subpic_id) included in the desired tile region on the basis of the information stored in the subpicture ID sample group. Therefore, the reproduction device can more easily rewrite (update) the subpicture identification information (subpic_id) on the basis of the information of the subpicture extraction sample group.

Method 1-2-1>

As illustrated in the fifth row from the top of the table in FIG. 13, storage of mapping information indicating the correspondence between the subpicture and the tile region described above may be omitted (Method 1-2-1).

FIG. 17 illustrates an example of syntax of VvcSubpicIDEntry( ) storing information defining the subpicture ID sample group in that case. As illustrated in FIG. 17, in this case, all_subpic_id_is_same as groupID_flag is stored in VvcSubpic_IDEntry( ) all_subpic_id_is_same_as groupID_flag is flag information indicating whether or not all subpictures (subpic_id) and tile regions (groupIDs) in a picture match (correspond on a one-to-one basis). In a case where a value of all_subpic_id_is_same as groupID flag is true (for example, 1), it indicates that all subpictures (subpic_id) in a picture match a tile region (groupID). In addition, in a case where a value of all_subpic_id is same as groupID_flag_is false (for example, 0), it indicates that at least some subpictures and tile regions do not correspond on a one-to-one basis (one tile region contains a plurality of subpictures). Then, it is defined that the groupID is stored only in a case where a value of all_subpic_id is same as groupID_flag is false (for example, 0). In other words, in a case where all the subpictures (subpic_d) in the picture and the tile region (groupID) match (correspond on a one-to-one basis), the storage of the groupID is omitted.

That is, the bitstream track may store only the subpicture identification information for the subpicture in which the subpicture identification information matches the tile region identification information.

In a case where all the subpictures (subpic_id) and the tile region (groupID) in the picture correspond to each other on a one-to-one basis, the groupID and the subpic_id are easily associated with each other on a one-to-one basis even if there is no mapping information. Therefore, by doing so, it is possible to suppress an increase in an unnecessary code amount. Therefore, a reduction in encoding efficiency can be suppressed.

4. Combination of VVC Base Track and VVC Extra Base Track

Method 2

As shown in the sixth row from the top of the table in FIG. 13, subpictures may be extracted from a plurality of tracks using both the VVC base track and the VVC extract base track (Method 2). That is, the VVC extract base track supports only extraction from one track, and in a case where extraction is performed from a plurality of tracks, the VVC base track may be used in combination.

For example, as illustrated in A of FIG. 18, some subpictures are extracted from two pictures, and the extracted subpictures are merged into one picture. In this case, as illustrated in B of FIG. 18, the information of the VVC extract base track may be applied when a subpicture is extracted from a picture, and the information of the VVC base track may be applied when the extracted subpictures are merged.

That is, the file storing the bitstream track and the extract base track may further include a merging base track storing information regarding merging of a plurality of subpictures extracted from different bitstream tracks on the basis of the extract base track.

Any of the VVC extract base tracks described in <2. Extract base track> and <3. Extension of Subpicture ID sample group> can be applied to this VVC extract base track.

Furthermore, an example of syntax of a VVC subpicture order entry (VvcSubpicOrderEntry( ) extends VisualSampleGroupEntry ('spor')) of the VVC base track is illustrated in FIG. 19.

As illustrated in FIG. 19, in the case of this example, extract track exist flag is stored in the VVC subpicture order entry. The extract track exist flag is flag information indicating whether or not the VVC extract base track is included in the track to be referred to. For example, in a case where the extract_track_exist_flag is true (for example, 1), it indicates that the VVC extract base track is included in the track to be referred to. Further, in a case where the extract_track_exist_flag is false (for example, 0), it indicates that the VVC extract base track is not included in the track to be referred to.

By storing such extract track exist flag, it is possible to easily identify whether or not the VVC extract base track is included in the track to be referred to. That is, the VVC extract base track and the VVC base track as described above can be used together more easily. Furthermore, the VVC extract base track can be included in the tracks that can be merged in the VVC base track. Furthermore, it is possible to easily determine whether the VVC extract base track is included in the VVC base track.

5. Application of V3C File Format

Method 3

As shown in the bottom row of the table of FIG. 13, the present technology may be applied to the V3C file format (Method 3).

As described with reference to FIG. 12, in the V3C file format, the V-PCC bitstream can be stored in the ISOBMFF file. The present technology may be applied to such a V3C file format, and partial access may be realized using the subpicture.

That is, the content may be a point cloud representing a three-dimensional object as a set of points, and the subpicture may be configured by a partial region that can be independently decoded of the point cloud.

Figure 20:
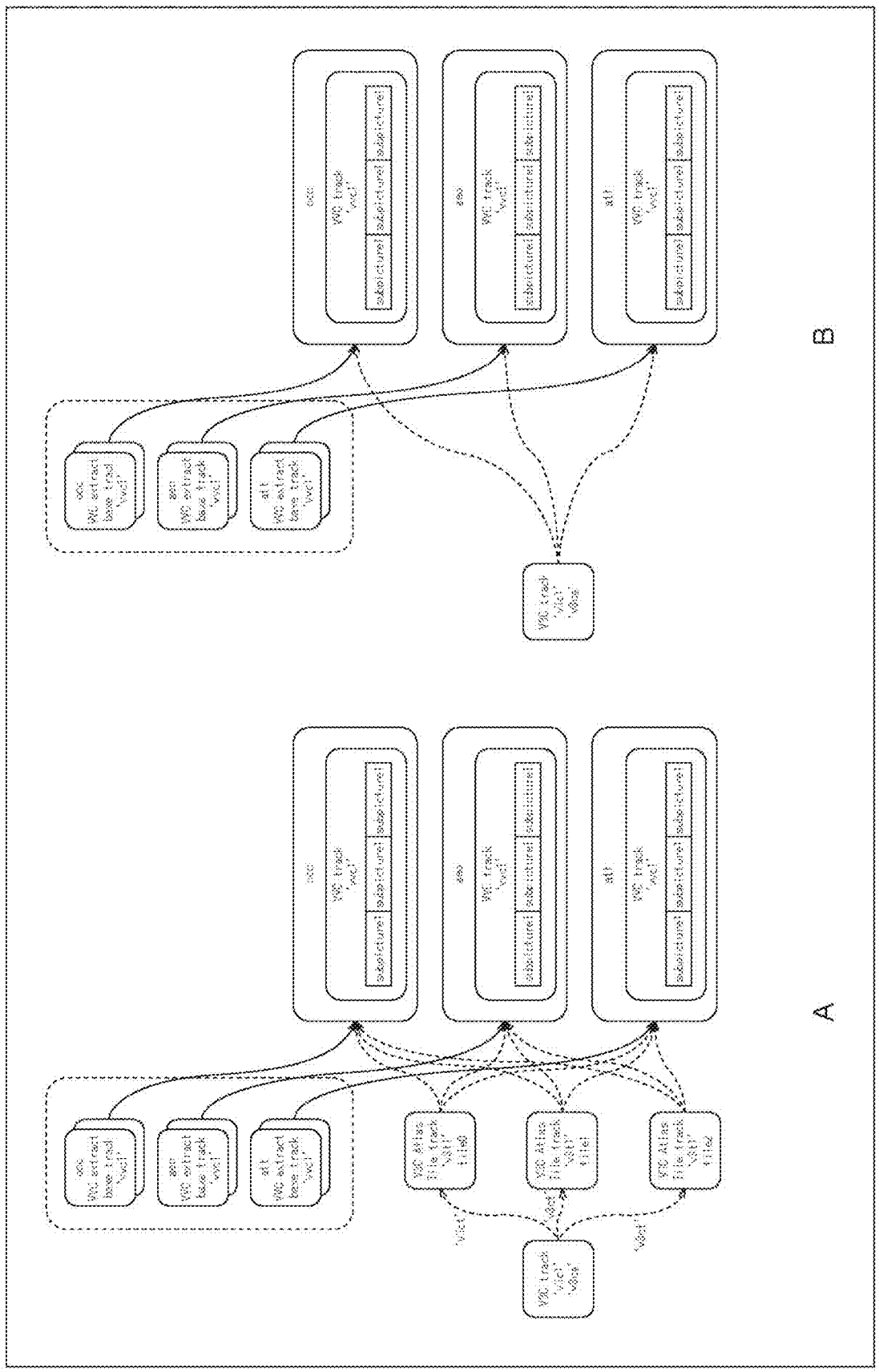
FIG. 20 is a diagram illustrating an application example in a case of a V3C bitstream.

For example, as illustrated in A of FIG. 20, partial access of the V-PCC bitstream may be realized using the VVC extract base track. In a case of the example shown in A of FIG. 20, there is a V3C atlas tile track. In such a case, as illustrated in a dotted frame in A of FIG. 20, it is only required to provide the VVC extract base track for each of the occupancy map, the geometry, and the attribute.

The VVC extract base track of each example described in any of <2. Extract base track>, <3. Extension of Subpicture ID sample group>, and <4. Combination of VVC Base Track and VVC Extra Base Track> can be applied to this VVC extract base track. In addition, a plurality of these examples may be applied in combination. That is, the extract base track storing the subpicture specifying information, which is information for specifying the subpicture to be extracted, is stored in the file.

At the time of reproduction, it is only required to extract and decode necessary subpictures using the VVC extract base track for each of the occupancy map, the geometry, and the attribute.

Furthermore, as illustrated in B of FIG. 20, the V3C file format may be a multi-track configuration in which each of the occupancy map, geometry, and attributes are stored in different tracks from one another in which there is no V3C atlas track.

However, the track storing the occupancy map is a VVC track including a plurality of subpictures. The same applies to the geometry and the attribute. In a case where the partial reproduction is performed, it can be realized by extracting and reproducing a specific subpicture.

6. First Embodiment

Figure 21:
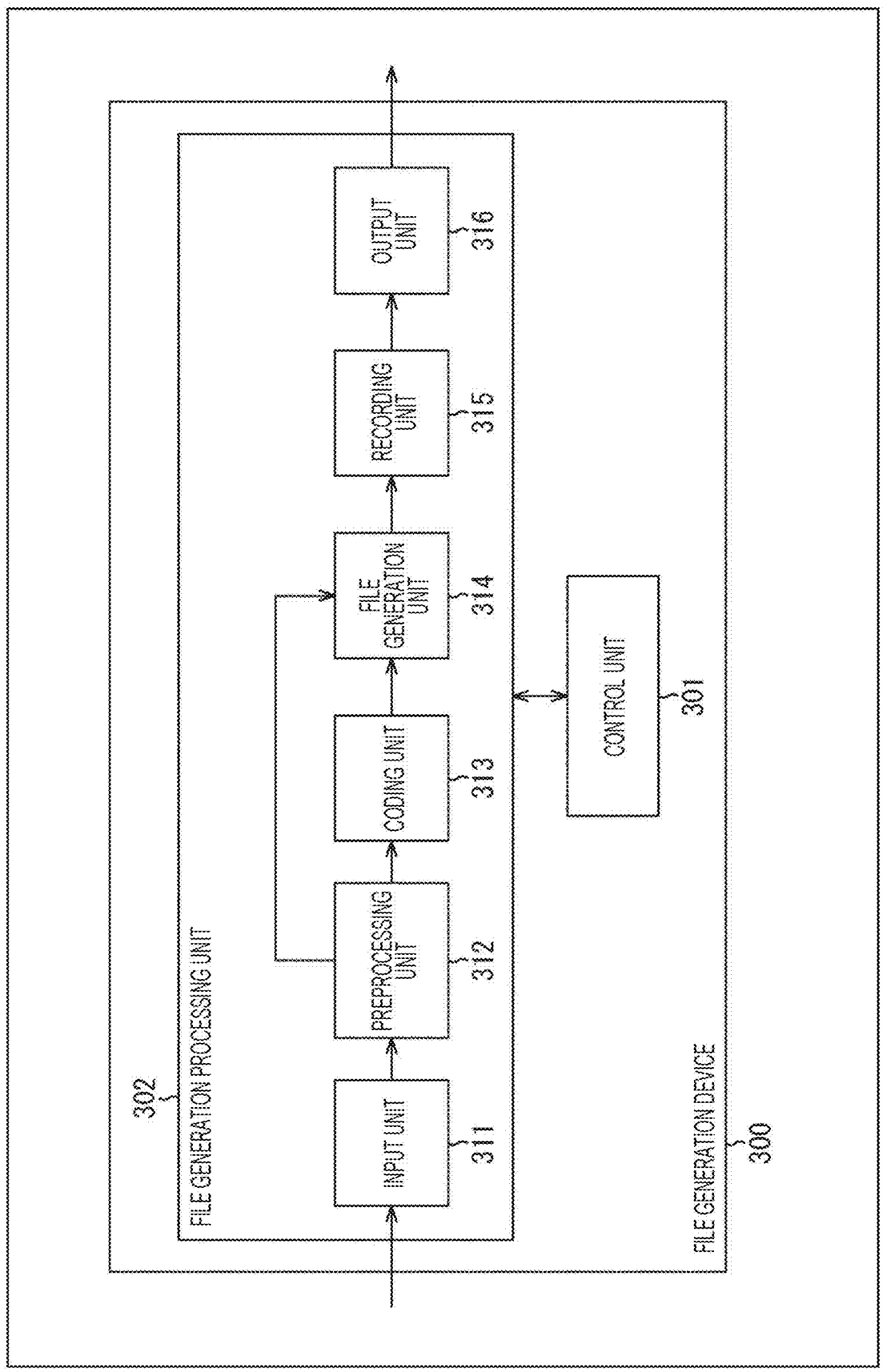
FIG. 21 is a block diagram illustrating a main configuration example of a file generation device.

File Generation Device (Each method of) the present technology described above can be applied to any device. FIG. 21 is a block diagram illustrating an example of a configuration of a file generation device which is an aspect of an information processing apparatus to which the present technology is applied. The file generation device 300 illustrated in FIG. 21 is a device that stores, in ISOBMFF, a VVC bitstream obtained by encoding video content including subpictures by VVC.

The file generation device 300 applies the above-described present technology, stores a plurality of subpictures in one track, and stores a VVC bitstream in a file so that some subpictures can be independently reproduced. That is, a file generation device 300 stores a bitstream track storing a bitstream of content having a subpicture in a frame and an extract base track storing subpicture specifying information which is information for specifying a subpicture to be extracted in the bitstream track in a file.

Note that, in FIG. 21, main processing units, data flows, and the like are illustrated, and those illustrated in FIG. 21 are not necessarily all. That is, in the file generation device 300, there may be a processing unit not illustrated as a block in FIG. 21, or there may be processing or a data flow not illustrated as an arrow or the like in FIG. 21.

As illustrated in FIG. 21, the file generation device 300 includes a control unit 301 and a file generation processing unit 302. The control unit 301 controls the file generation processing unit 302. The file generation processing unit 302 is controlled by the control unit 301 and performs processing related to file generation. For example, the file generation processing unit 302 acquires data of content having a subpicture in a picture, encodes the data, and generates a VVC bitstream. The file generation processing unit 302 further stores the generated VVC bitstream in the file of ISOBMFF, and outputs the file to the outside of the file generation device 300.

The file generation processing unit 302 includes an input unit 311, a preprocessing unit 312, an encoding unit 313, a file generation unit 314, a recording unit 315, and an output unit 316.

The input unit 311 acquires data of content having a subpicture in a picture, and supplies the data to the preprocessing unit 312. The preprocessing unit 312 extracts information necessary for file generation from the data of the content. The preprocessing unit 312 supplies the extracted information to the file generation unit 314. In addition, the preprocessing unit 312 supplies the data of the content to the encoding unit 313.

The encoding unit 313 encodes the data of the content supplied from the preprocessing unit 312 using the VVC method to generate a VVC bitstream. The encoding unit 313 supplies the generated VVC bitstream to the file generation unit 314.

The file generation unit 314 stores the VVC bitstream supplied from the encoding unit 313 in the file of ISOBMFF. At that time, the file generation unit 314 appropriately stores the information supplied from the preprocessing unit 312 in the file.

Furthermore, the file generation unit 314 applies the present technology described in any one of <2. Extract base track>, <3. Extension of Subpicture ID sample group>, <4. Combination of VVC Base Track and VVC Extra Base Track>, and <5. Application of V3C File Format> or a combination thereof, and generates a file that stores a VVC bitstream.

That is, the file generation unit 314 generates a file storing a bitstream track storing a bitstream of content having a subpicture in a frame, and an extract base track storing subpicture specifying information that is information for specifying a subpicture to be extracted in the bitstream track.

The file generation unit 314 supplies the generated file to the recording unit 315. The recording unit 315 includes an arbitrary recording medium such as a hard disk or a semiconductor memory, for example, and records the file supplied from the file generation unit 314 in the recording medium. Furthermore, the recording unit 315 reads a file recorded in the recording medium in accordance with a request from the control unit 301 or the output unit 316 or at a predetermined timing, and supplies the file to the output unit 316.

The output unit 316 acquires the file supplied from the recording unit 315, and outputs the file to the outside of the file generation device 300 (for example, a distribution server, a reproduction device, or the like).

With such a configuration, the file generation device 300 can store, in the extract base track, reconstruction information necessary for reconstructing a bitstream from some subpictures. Therefore, the reproduction device that reproduces the file can extract the bitstream of the desired subpicture from the bitstream track on the basis of the reconstruction information stored in such the extract base track and reconstruct the bitstream of the extracted subpicture. Therefore, an increase in the load of the reproduction processing can be suppressed.

Flow of File Generation Processing

Figure 22:
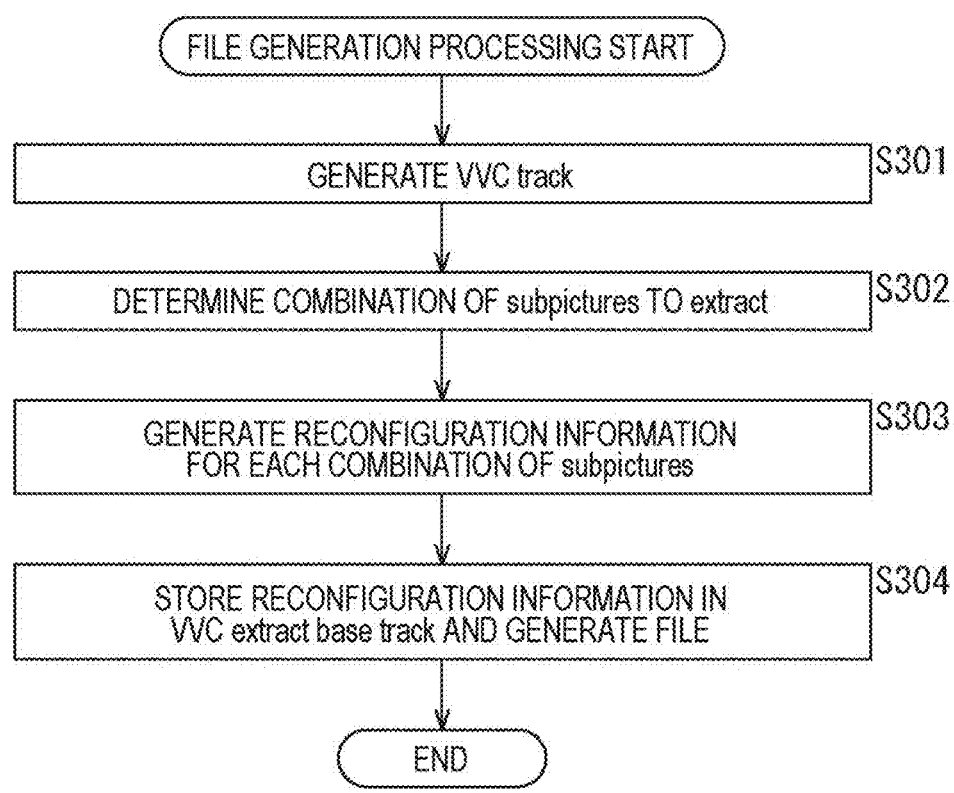
FIG. 22 is a flowchart illustrating an example of a flow of file generation processing.

An example of a flow of file generation processing executed by the file generation unit 314 in FIG. 21 will be described with reference to a flowchart in FIG. 22.

When the file generation processing is started, the file generation unit 314 of the file generation device 300 generates a VVC bitstream track storing a VVC bitstream in step S301.

In step S302, the file generation unit 314 determines a combination of subpictures to be extracted.

In step S303, the file generation unit 314 generates, for each combination of subpictures determined in step S302, reconstruction information necessary for reconstructing a bitstream from some subpictures. That is, the file generation unit 314 generates, as the reconstruction information, subpicture specifying information that is information for specifying a subpicture to be extracted in the bitstream track.

In step S304, the file generation unit 314 stores the reconstruction information generated in step S303 in the VVC extract base track and generates a file. That is, the file generation unit 314 generates a file storing a bitstream track storing a bitstream of content having a subpicture in a frame, and an extract base track storing subpicture specifying information that is information for specifying a subpicture to be extracted in the bitstream track.

When the file is generated, the file generation processing ends.

As described above, by executing each processing, the file generation device 300 can generate the extract base track storing the reconstruction information necessary for reconstructing the bitstream from some subpictures, and generate the file storing the extract base track. Therefore, the reproduction device that reproduces the file can extract the bitstream of the desired subpicture from the bitstream track on the basis of the reconstruction information stored in such the extract base track and reconstruct the bitstream of the extracted subpicture. Therefore, an increase in the load of the reproduction processing can be suppressed.

7. Second Embodiment

Client Device

Figure 23:
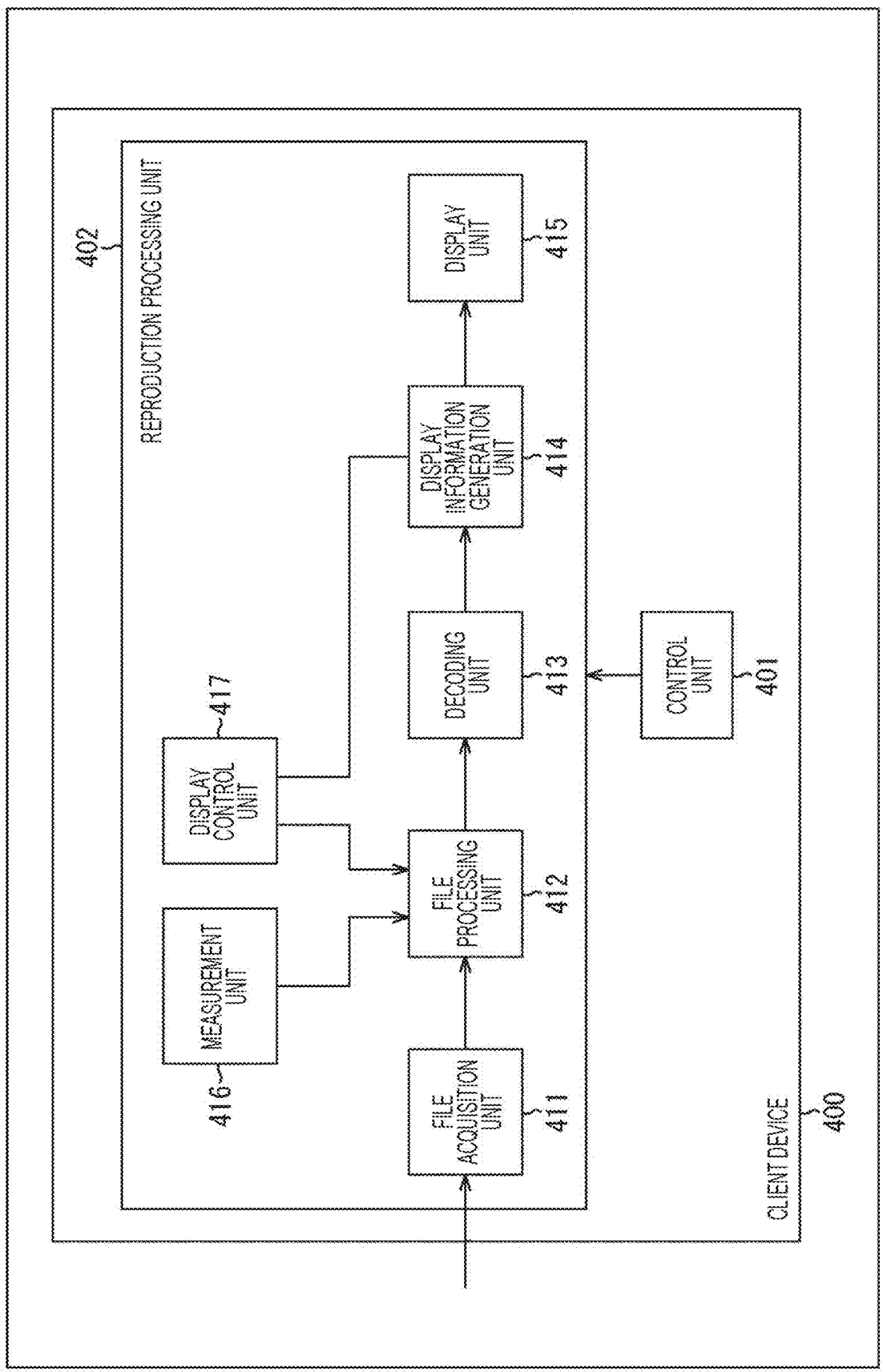
FIG. 23 is a block diagram illustrating a main configuration example of a client device.

FIG. 23 is a block diagram illustrating an example of a configuration of a reproduction device which is an aspect of an information processing apparatus to which the present technology is applied. A client device 400 illustrated in FIG. 23 is a reproduction device that decodes a VVC bitstream stored in a file of a VVC file format, and generates and displays a display image of the generated moving image content. For example, the client device 400 decodes the VVC bitstream stored in the file generated by the file generation device 300, and generates and displays a display image of the generated moving image content. At that time, the client device 400 applies the above-described present technology, extracts some subpictures from the file, reconstructs the bitstream, and decodes the reconstructed bitstream.

Note that, in FIG. 23, main processing units, data flows, and the like are illustrated, and those illustrated in FIG. 23 are not necessarily all. That is, in the client device 400, there may be a processing unit not illustrated as a block in FIG. 23, or there may be processing or a data flow not illustrated as an arrow or the like in FIG. 23.

As illustrated in FIG. 23, the client device 400 has a control unit 401 and a reproduction processing unit 402. The control unit 401 performs processing related to control of the reproduction processing unit 402. The reproduction processing unit 402 performs processing related to reproduction of video content stored in a file. For example, the reproduction processing unit 402 is controlled by the control unit 401 and acquires a file from a distribution server (not illustrated) or the like.

This file is a file conforming to the VVC file format generated by applying the present technology. For example, the file is a file generated by the file generation device 300. That is, the file is for storing a bitstream track storing a bitstream of content having a subpicture in a frame and an extract base track storing subpicture specifying information which is information for specifying a subpicture to be extracted in the bitstream track.

The reproduction processing unit 402 executes reproduction processing on the acquired file, decodes a bitstream of video content stored in the file, and generates and displays a display image of the video content.

The reproduction processing unit 402 includes a file acquisition unit 411, a file processing unit 412, a decoding unit 413, a display information generation unit 414, a display unit 415, a measurement unit 416, and a display control unit 417.

The file acquisition unit 411 acquires a file in the VVC file format supplied from the outside of the client device 400, for example, the distribution server, the file generation device 300, or the like. As described above, in this file, a bitstream track storing a bitstream of content having a subpicture in a frame and an extract base track storing subpicture specifying information which is information for specifying a subpicture to be extracted in the bitstream track are stored. The file acquisition unit 411 supplies the acquired file to the file processing unit 412.

The file processing unit 412 acquires the file supplied from the file acquisition unit 411. The file processing unit 412 acquires the measurement result supplied from the measurement unit 416. The file processing unit 412 acquires the control information supplied from the display control unit 417.

Using these pieces of information, the file processing unit 412 extracts some subpictures from the file, and generates a bitstream of the extracted subpictures. At that time, the file processing unit 412 applies the present technology described in any one of <2. Extract base track>, <3. Extension of Subpicture ID sample group>, <4. Combination of VVC Base Track and VVC Extra Base Track>, and <5. Application of V3C File Format> or a combination thereof, and executes processing on this file.

That is, the file processing unit 412 extracts a subpicture from the bitstream track stored in the file on the basis of the extract base track stored in the file, and generates a bitstream of the extracted subpicture.

The file processing unit 412 supplies the generated bitstream to the decoding unit 413. The decoding unit 413 decodes the supplied bitstream, and generates data of video content of the extracted subpicture. The decoding unit 413 supplies data of the generated video content to the display information generation unit 414.

The display information generation unit 414 acquires the data of the video content supplied from the decoding unit 413. Furthermore, the display information generation unit 414 acquires the control information supplied from the display control unit 417. Then, the display information generation unit 414 generates the display image and the like from the acquired data of the video content according to the control information. The display information generation unit 414 supplies the generated display image and the like to the display unit 415. The display unit 415 includes a display device, and displays the supplied display image using the display device. The measurement unit 416 measures arbitrary information and supplies the measurement result to the file processing unit 412. The display control unit 417 controls display by supplying control information to the file processing unit 412 and the display information generation unit 414.

With such a configuration, the client device 400 can extract a bitstream of a part of subpictures as a file on the basis of the extract base track that stores reconstruction information necessary for reconstructing a bitstream from the part of subpictures. Therefore, the client device 400 can more easily reconstruct the bitstream of the extracted subpicture. Therefore, an increase in the load of the reproduction processing can be suppressed.

Flow of Reproduction Processing

Figure 24:
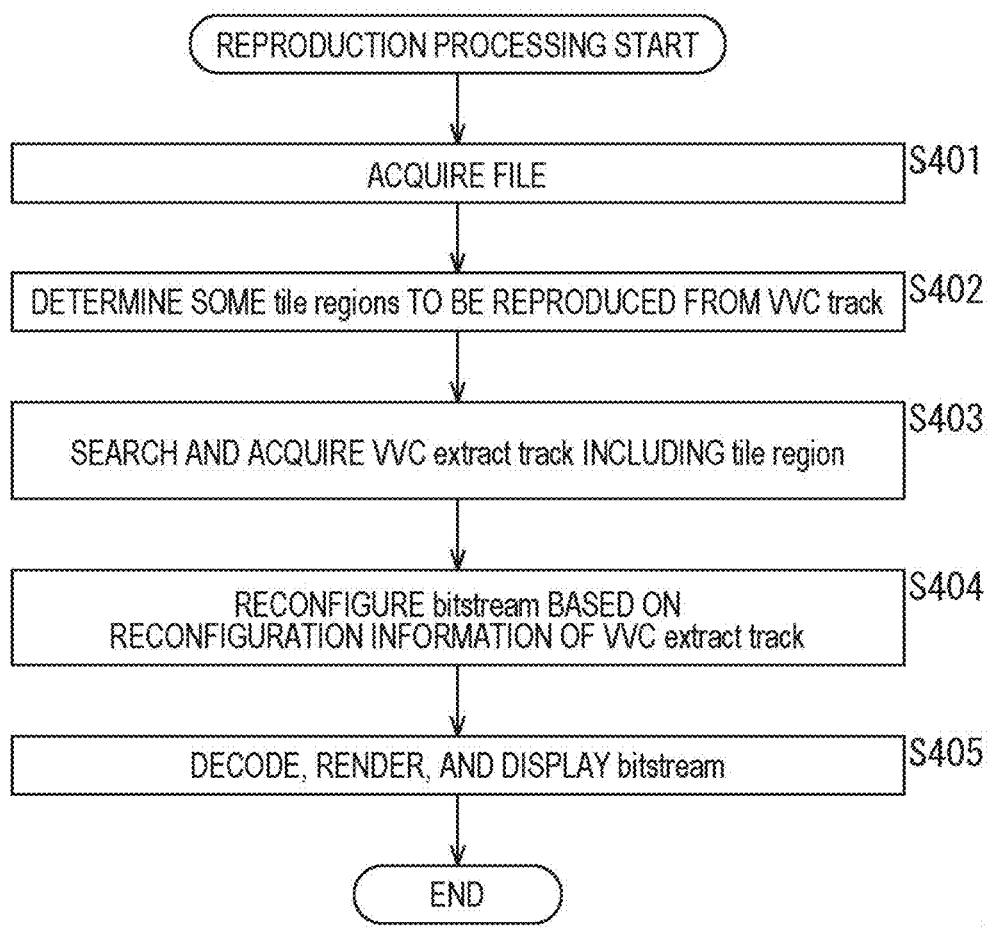
FIG. 24 is a flowchart illustrating an example of a flow of reproduction processing.

An example of a flow of the reproduction processing executed by the client device 400 in FIG. 23 will be described with reference to the flowchart in FIG. 24.

When the reproduction processing is started, the file processing unit 412 of the client device 400 acquires a file in the VVC file format in step S401.

In step S402, the file processing unit 412 determines some tile regions to be reproduced on the basis of the information stored in the VVC bitstream track stored in the file acquired in step S401.

In step S403, the file processing unit 412 searches and acquires the VVC extract base track including the tile region determined in step S402 from the file.

In step S404, the file processing unit 412 extracts subpictures corresponding to some tile regions to be reproduced from the file on the basis of the reconstruction information of the VVC extract base track acquired by the processing in step S403, and reconstructs a bitstream thereof.

That is, the file processing unit 412 extracts a desired subpicture from a bitstream track that is stored in the file and that stores a bitstream of content having a subpicture in a frame, on the basis of an extract base track storing subpicture specifying information that is stored in the file and that is information for specifying a subpicture to be extracted, and generates a bitstream.

In step S405, the decoding unit 413 decodes the bitstream reconstructed in step SS04, and obtains data of the video image content of the desired tile region. The display information generation unit 414 generates the display image. The display unit 415 displays the display image.

When the processing of step S405 ends, the reproduction processing ends.

As described above, by executing each processing, the client device 400 can extract a desired subpicture from the bitstream track on the basis of the extract base track including the subpicture specifying information and to reconstruct the bitstream. That is, it can easily reconstruct the bitstream without analyzing the bitstream. Therefore, an increase in the load of the reproduction processing can be suppressed.

8. Appendix

Computer

The series of processes described above can be executed by hardware or by software. In a case where the series of processing is executed by software, a program constituting the software is installed in a computer. Here, the computer includes a computer incorporated in dedicated hardware, a general-purpose personal computer capable of executing various functions by installing various programs, and the like, for example.

FIG. 25 is a block diagram illustrating a configuration example of hardware of a computer that executes the above-described series of processing by a program.

In a computer 900 illustrated in FIG. 25, a central processing unit (CPU) 901, a read only memory (ROM) 902, and a random access memory (RAM) 903 are mutually connected via a bus 904.

An input/output interface 910 is also connected to the bus 904. An input unit 911, an output unit 912, a storage unit 913, a communication unit 914, and a drive 915 are connected to the input/output interface 910.

The input unit 911 includes, for example, a keyboard, a mouse, a microphone, a touch panel, an input terminal, and the like. The output unit 912 includes, for example, a display, a speaker, an output terminal, and the like. The storage unit 913 includes, for example, a hard disk, a RAM disk, a nonvolatile memory, and the like. The communication unit 914 includes, for example, a network interface. The drive 915 drives a removable medium 921 such as a magnetic disk, an optical disk, a magneto-optical disk, or a semiconductor memory.

In the computer configured as described above, for example, the CPU 901 loads a program stored in the storage unit 913 into the RAM 903 via the input/output interface 910 and the bus 904 and executes the program, whereby the above-described series of processing is performed. The RAM 903 also appropriately stores data and the like necessary for the CPU 901 to execute various processes.

The program executed by the computer can be applied by being recorded in the removable medium 921 as a package medium or the like, for example. In this case, the program can be installed in the storage unit 913 via the input/output interface 910 by attaching the removable medium 921 to the drive 915.

Furthermore, this program can be also provided via a wired or wireless transmission medium such as a local area network, the Internet, or digital satellite broadcasting. In this case, the program can be received by the communication unit 914 and installed in the storage unit 913.

In addition, this program can be installed in the ROM 902 or the storage unit 913 in advance.

Object to which Present Technology is Applicable

The present technology can be applied to an arbitrary image encoding/decoding method.

Furthermore, the present technology can be applied to an arbitrary configuration. For example, the present technology can be applied to various electronic devices.

Furthermore, for example, the present technology can also be implemented as a partial configuration of a device, such as a processor (for example, a video processor) as a system large scale integration (LSI) or the like, a module (for example, a video module) using a plurality of processors or the like, a unit (for example, a video unit) using a plurality of modules or the like, or a set (for example, a video set) obtained by further adding other functions to a unit.

Furthermore, for example, the present technology can also be applied to a network system including a plurality of apparatuses. For example, the present technology may be implemented as cloud computing shared and processed in cooperation by a plurality of apparatuses via a network. For example, the present technology may be implemented in a cloud service that provides a service related to an image (moving image) to an arbitrary terminal such as a computer, an audio visual (AV) device, a portable information processing terminal, or an Internet of Things (IoT) device.

Note that, in the present specification, a system means a set of a plurality of configuration elements (apparatuses, modules (parts), or the like), and it does not matter whether or not all the components are in the same housing. Therefore, a plurality of apparatuses housed in separate housings and connected via a network and one apparatus in which a plurality of modules is housed in one housing are both systems.

Field and Application to Which Present Technology is Applicable

The system, the apparatus, the processing unit, and the like to which the present technology is applied can be used in arbitrary fields such as traffic, medical care, crime prevention, agriculture, livestock industry, mining, beauty, factory, home appliance, weather, and natural monitoring. Furthermore, the application thereof is also arbitrary.

For example, the present technology can be applied to a system or a device provided for providing content for appreciation or the like. Furthermore, for example, the present technology can also be applied to systems and devices provided for traffic, such as traffic condition supervision and automatic driving control. Moreover, for example, the present technology can also be applied to a system or a device provided for security. Furthermore, for example, the present technology can be applied to systems or devices used for automatic control of machines and the like. Moreover, for example, the present technology can also be applied to systems and devices used for agriculture and livestock industry. Furthermore, the present technology can also be applied to a system and a device that monitor natural states such as volcanoes, forests, and oceans, wildlife, and the like. Moreover, for example, the present technology can also be applied to systems and devices used for sports.

8. Others

Note that, in the present specification, the "flag" is information for identifying a plurality of states, and includes not only information used for identifying two states of true (1) and false (0) but also information capable of identifying three or more states. Therefore, the value that can be taken by the "flag" may be, for example, a binary of 1/0 or a ternary or more. That is, the number of bits constituting this "flag" is arbitrary, and may be one bit or a plurality of bits. Furthermore, since the identification information (including the flag) is assumed to include not only the identification information in the bitstream but also the difference information of the identification information with respect to certain reference information in the bitstream, in the present specification, the "flag" and the "identification information" include not only the information but also the difference information with respect to the reference information.

Furthermore, various types of information (metadata or the like) related to the encoded data (bitstream) may be transmitted or recorded in any form as long as the information is associated with the encoded data. Here, the term "associate" means, for example, that one data can be used (linked) when the other data is processed. That is, the data associated with each other may be collected as one data or may be individual data. For example, information associated with encoded data (image) may be transmitted on a transmission path different from that of the encoded data (image).

Furthermore, for example, the information associated with the encoded data (image) may be recorded in a recording medium (or another recording area of the same recording medium) different from the encoded data (image). Note that this "association" may be a part of data instead of the entire data. For example, an image and information corresponding to the image may be associated with each other in an arbitrary unit such as a plurality of frames, one frame, or a part in a frame.

Note that, in the present specification, terms such as "combine," "multiplex," "add," "integrate," "include," "store," "put in," "inlet" and "insert" mean to combine a plurality of items into one, for example, to combine encoded data and metadata into one data, and mean one method of the above-described "associate".

Furthermore, the embodiments of the present technology are not limited to the above-described embodiments, and various modification examples can be made without departing from the gist of the present technology.

For example, a configuration described as one apparatus (or processing unit) may be divided and configured as a plurality of apparatuses (or processing units). Conversely, configurations described above as a plurality of apparatuses (or processing units) may be collectively configured as one apparatus (or processing unit). Furthermore, a configuration other than the above-described configuration may be added to the configuration of each apparatus (or each processing unit). Moreover, as long as the configuration and operation of the entire system are substantially the same, a part of the configuration of a certain apparatus (or processing unit) may be included in the configuration of another apparatus (or another processing unit).

Furthermore, for example, the above-described program may be executed in an arbitrary apparatus. In that case, it is only required that the apparatus has a necessary function (functional block or the like) and can obtain necessary information.

Furthermore, for example, each step of one flowchart may be executed by one apparatus, or may be shared and executed by a plurality of apparatuses.

Moreover, in a case where a plurality of processes is included in one step, the plurality of processing elements may be executed by one apparatus, or may be shared and executed by a plurality of apparatuses. In other words, a plurality of processing elements included in one step can also be executed as processing elements of a plurality of steps. Conversely, the processing described as a plurality of steps can be collectively executed as one step.

Furthermore, for example, in the program executed by the computer, processing of steps describing the program may be executed in time series in the order described in the present specification, or may be executed in parallel or individually at necessary timing such as when a call is made. That is, as long as there is no contradiction, the processing of each step may be executed in an order different from the above-described order. Moreover, the processing of steps describing this program may be executed in parallel with the processing of another program, or may be executed in combination with the processing of another program.

Furthermore, for example, a plurality of techniques related to the present technology can be implemented independently as a single body as long as there is no contradiction. Of course, a plurality of arbitrary present technologies can be implemented in combination. For example, some or all of the present technology described in any of the embodiments can be implemented in combination with some or all of the present technology described in other embodiments.

Furthermore, some or all of the above-described arbitrary present technology can be implemented in combination with other technologies not described above.

Note that the present technology can also adopt the following configurations.

(1) An information processing apparatus including:
 a file generation unit configured to generate a file storing
  a bitstream track storing a bitstream of content having a subpicture in a frame, and
  an extract base track storing subpicture specifying information that is information for specifying the subpicture to be extracted in the bitstream track.

(2) The information processing apparatus according to (1), in which
 the subpicture specifying information includes tile region identification information that is identification information of a tile region including the subpicture.

(3) The information processing apparatus according to (2), in which
 the extract base track sets the subpictures extracted into one bitstream as one set, and stores the subpicture specifying information for each set.

(4) The information processing apparatus according to (3), in which
 the extract base track further stores set identification information that is identification information of the set.

(5) The information processing apparatus according to any one of (2) to (4), in which
 the bitstream track further stores, for each of the subpictures stored in the bitstream track, subpicture identification information that is identification information of the subpicture, and the tile region identification information of a tile region including the subpicture.

(6) The information processing apparatus according to (5), in which
 the bitstream track stores only the subpicture identification information for the subpicture in which the subpicture identification information matches the tile region identification information.

(7) The information processing apparatus according to any one of (1) to (6), in which
 the extract base track further stores parameter set update information that is information for updating a parameter set to correspond to a bitstream of the extracted subpicture.

(8) The information processing apparatus according to (7), in which
 the parameter set update information includes subpicture update information that is information for updating subpicture identification information that is identification information of the subpicture to correspond to a bitstream of the extracted subpicture.

(9) The information processing apparatus according to any one of (1) to (8), in which
 the file further includes
 a merging base track storing information regarding merging of a plurality of the subpictures extracted from the bitstream tracks different from each other on the basis of the extract base track.

(10) The information processing apparatus according to any one of (1) to (9), in which
 the content is a point cloud representing an object having a three-dimensional shape as a set of points, and the subpicture is configured by a partial region in which the point cloud can be independently decoded.

(11) An information processing method including:
generating a file storing
  a bitstream track storing a bitstream of content having a subpicture in a frame, and
  an extract base track storing subpicture specifying information that is information for specifying the subpicture to be extracted in the bitstream track.

(31) An information processing apparatus including:
a bitstream generation unit configured to extract a subpicture from a bitstream track and generate a bitstream on the basis of the extract base track of a file storing
  a bitstream track storing a bitstream of content having a subpicture in a frame, and
  an extract base track storing subpicture specifying information that is information for specifying the subpicture to be extracted in the bitstream track.

(32) The information processing apparatus according to (31), in which
the subpicture specifying information includes tile region identification information that is identification information of a tile region including the subpicture.

(33) The information processing apparatus according to (32), in which
the extract base track sets the subpictures extracted into one bitstream as one set, and stores the subpicture specifying information for each set.

(34) The information processing apparatus according to (33), in which
the extract base track further stores set identification information that is identification information of the set.

(35) The information processing apparatus according to any one of (32) to (34), in which
the bitstream track further stores, for each of the subpictures stored in the bitstream track, subpicture identification information that is identification information of the subpicture, and the tile region identification information of a tile region including the subpicture.

(36) The information processing apparatus according to (35), in which
the bitstream track stores only the subpicture identification information for the subpicture in which the subpicture identification information matches the tile region identification information.

(37) The information processing apparatus according to any one of (31) to (36), in which
the extract base track further stores parameter set update information that is information for updating a parameter set to correspond to a bitstream of the extracted subpicture.

(38) The information processing apparatus according to (37), in which
the parameter set update information includes subpicture update information that is information for updating subpicture identification information that is identification information of the subpicture to correspond to a bitstream of the extracted subpicture.

(39) The information processing apparatus according to any one of (31) to (38), in which
the file further includes:
a merging base track storing information regarding merging of a plurality of the subpictures extracted from the bitstream tracks different from each other on the basis of the extract base track.

(40) The information processing apparatus according to any one of (31) to (39), in which
the content is a point cloud representing an object having a three-dimensional shape as a set of points, and the subpicture is configured by a partial region in which the point cloud can be independently decoded.

(41) An information processing method including:
extracting a subpicture from a bitstream track and generating a bitstream on the basis of the extract base track of a file storing
  a bitstream track storing a bitstream of content having a subpicture in a frame, and
  an extract base track storing subpicture specifying information that is information for specifying the subpicture to be extracted in the bitstream track.

REFERENCE SIGNS LIST

300 File generation device
301 Control unit
302 File generation processing unit
311 Input unit
312 Preprocessing unit
313 Encoding unit
314 File generation unit
315 Recording unit
316 Output unit
400 Client device
401 Control unit
402 Reproduction processing unit
411 File acquisition unit
412 File processing unit
413 Decoding unit
414 Display information generation unit
415 Display unit
416 Measurement unit
417 Display control unit

The invention claimed is:

1. An information processing apparatus comprising:
circuitry configured to
generate a bitstream track storing a bitstream of content having a plurality of subpictures in a frame,
generate subpicture specifying information that is information for specifying a subpicture to be extracted among the plurality of subpictures in the bitstream track, the subpicture specifying information including tile region identification information that is identification information of a tile region including the subpicture to be extracted, and
generate a file including the bitstream track and an extract base track, the extract base track including the subpicture specifying information,
wherein the circuitry is further configured to store mapping information in the bitstream track by extending subpicture identification sample group information included in the bitstream track, the mapping information indicating a correspondence between the subpictures and the tile region.

2. The information processing apparatus according to claim 1, wherein the circuitry is configured to manage two or more subpictures extracted among the plurality of subpictures into one bitstream as one set, and store the subpicture specifying information in the extract base track on a basis of each set.

3. The information processing apparatus according to claim 2, wherein
the extract base track further stores set identification information that is identification information of the set.

4. The information processing apparatus according to claim 1, wherein
the bitstream track further stores, for each of the plurality of subpictures stored in the bitstream track, subpicture identification information that is identification information of the subpicture, and the tile region identification information of a tile region including the subpicture.

5. The information processing apparatus according to claim 4, wherein
the bitstream track stores only the subpicture identification information for the subpicture in which the subpicture identification information matches the tile region identification information.

6. The information processing apparatus according to claim 1, wherein
the extract base track further stores parameter set update information that is information for updating a parameter set to correspond to a bitstream of the extracted subpicture.

7. The information processing apparatus according to claim 6, wherein
the parameter set update information includes subpicture update information that is information for updating subpicture identification information that is identification information of the subpicture to correspond to the bitstream of the extracted subpicture.

8. The information processing apparatus according to claim 1,
the file further includes:
a merging base track storing information regarding merging of one or more of the plurality of the subpictures extracted from two or more bitstream tracks different from each other on a basis of the extract base track.

9. The information processing apparatus according to claim 4, wherein
the subpicture identification sample group information indicates the subpicture identification information of the subpictures included in the bitstream track in decoding order,
the circuitry is further configured to manage the subpicture identification information in a subpicture order sample group stored in the bitstream track, the subpicture order sample group including rewriting information of the subpicture identification information.

10. An information processing method comprising:
generating a bitstream track storing a bitstream of content having a plurality of subpictures in a frame;
generating subpicture specifying information that is information for specifying a subpicture to be extracted among the plurality of subpictures in the bitstream track, the subpicture specifying information including tile region identification information that is identification information of a tile region including the subpicture to be extracted; and
generating a file including the bitstream track and an extract base track, the extract base track including the subpicture specifying information,
wherein, further storing mapping information in the bitstream track by extending subpicture identification sample group information included in the bitstream track, the mapping information indicating a correspondence between the subpictures and the tile region.

11. An information processing apparatus comprising:
circuitry configured to
control reception of a file including a bitstream track and an extract base track, the bitstream track including a bitstream of content having a plurality of subpictures,
determine a tile region to be reproduced based on the bitstream track, and
generate a bitstream by extracting a subpicture to be extracted from the bitstream track based on the extract base track, the extract base track storing subpicture specifying information that is information for specifying the subpicture to be extracted among the plurality of subpictures in the bitstream track, the subpicture specifying information including tile region identification information that is identification information of the tile region including the subpicture to be extracted
wherein the bitstream track includes mapping information by extending subpicture identification sample group information, the mapping information indicating a correspondence between the subpictures and the tile region.

12. The information processing apparatus according to claim 11, wherein
the extract base track is managed by two or more subpictures extracted among the plurality of subpictures into one bitstream as one set, and the subpicture specifying information is stored in the extract base track on a basis of each set.

13. The information processing apparatus according to claim 12, wherein
the extract base track further stores set identification information that is identification information of the set.

14. The information processing apparatus according to claim 11, wherein
the bitstream track further stores, for each of the plurality of subpictures stored in the bitstream track, subpicture identification information that is identification information of the subpicture, and the tile region identification information of a tile region including the subpicture.

15. The information processing apparatus according to claim 14, wherein
the bitstream track stores only the subpicture identification information for the subpicture in which the subpicture identification information matches the tile region identification information.

16. The information processing apparatus according to claim 11, wherein
the extract base track further stores parameter set update information that is information for updating a parameter set to correspond to a bitstream of the extracted subpicture.

17. The information processing apparatus according to claim 16, wherein
the parameter set update information includes subpicture update information that is information for updating subpicture identification information that is identification information of the subpicture to correspond to the bitstream of the extracted subpicture.

18. The information processing apparatus according to claim 17, wherein
the file further includes
a merging base track storing information regarding merging of one or more of the plurality of the subpictures extracted from two or more bitstream tracks different from each other on a basis of the extract base track.

19. The information processing apparatus according to claim 11, wherein
the subpicture identification information is stored in a subpicture order sample group stored in the bitstream track, the subpicture order sample group including rewriting information of the subpicture identification information, the circuitry is configured to specify the subpicture identification information of the subpicture corresponding to the tile region to be reproduced, based on the mapping information, and the circuitry is configured to rewrite the subpicture indication information in the subpicture order sample group.

20. An information processing method comprising:

controlling reception of a file including a bitstream track and an extract base track, the bitstream track including a bitstream of content having a plurality of subpictures;

determining a tile region to be reproduced based on the bitstream track; and generating a bitstream by extracting a subpicture to be extracted from the bitstream track based on the extract base track, the extract base track storing subpicture specifying information that is information for specifying the subpicture to be extracted among the plurality of subpictures in the bitstream track, the subpicture specifying information including tile region identification information that is identification information of the tile region including the subpicture to be extracted;

wherein the bitstream track includes mapping information by extending subpicture identification sample group information, the mapping information indicating a correspondence between the subpictures and the tile region.

* * * * *